(12) United States Patent
Bravick et al.

(10) Patent No.: US 11,568,415 B2
(45) Date of Patent: Jan. 31, 2023

(54) DECENTRALIZED SAFEGUARD AGAINST FRAUD

(71) Applicant: STRONG FORCE TX PORTFOLIO 2018, LLC, Fort Lauderdale, FL (US)

(72) Inventors: Eric Bravick, Traverse City, MI (US); David Kuchar, San Francisco, CA (US); Malcolm Garland, San Francisco, CA (US); Harrison Dahme, San Francisco, CA (US); David Marc Grossblatt, San Francisco, CA (US)

(73) Assignee: STRONG FORCE TX PORTFOLIO 2018, LLC, Fort Lauderdale, FL (US)

( * ) Notice: Subject to any disclaimer, the term of this patent is extended or adjusted under 35 U.S.C. 154(b) by 324 days.

(21) Appl. No.: 16/429,562

(22) Filed: Jun. 3, 2019

(65) Prior Publication Data
US 2019/0370813 A1      Dec. 5, 2019

Related U.S. Application Data

(60) Provisional application No. 62/680,017, filed on Jun. 4, 2018.

(51) Int. Cl.
*G06Q 20/40*     (2012.01)
*H04L 9/06*      (2006.01)

(52) U.S. Cl.
CPC ....... *G06Q 20/4016* (2013.01); *H04L 9/0637* (2013.01); *G06Q 2220/00* (2013.01); *H04L 2209/56* (2013.01)

(58) Field of Classification Search
CPC .......... G06Q 20/4016; G06Q 2220/00; G06Q 20/02; G06Q 20/223; H04L 9/0637; H04L 2209/56; H04L 2209/38; H04L 9/3239

(Continued)

(56) References Cited

U.S. PATENT DOCUMENTS 9,578,043 B2 *   2/2017   Mawji et al. ............. G06F 7/04
9,818,116 B2    11/2017   Caldera
(Continued)

FOREIGN PATENT DOCUMENTS

| WO | 2015085393 A1 | 6/2015 | |
| WO | WO 2015/085393 A1 * | 6/2015 | ............. G06Q 20/06 |
| WO | WO 2019/112713 A1 * | 6/2019 | ............. G06Q 20/40 |

OTHER PUBLICATIONS

Mauro Conti et al., A survey on Security and Privacy Issues of Bitcoin, Dec. 25, 2018, IEEE, arXiv:1706.00916v3. (Year: 2017).*

(Continued)

*Primary Examiner* — Mohammad Z Shaikh
*Assistant Examiner* — George N. Proios
(74) *Attorney, Agent, or Firm* — RMCK Law Group, PLC

(57) ABSTRACT

A method includes acquiring, at a node server, blockchain data for a blockchain address on a blockchain network. The blockchain data includes a plurality of transactions for the blockchain address. The method includes generating a local node trust score for the blockchain address based on the blockchain data. The local node trust score indicates a likelihood that the blockchain address is involved in fraudulent activity. The method includes receiving, from a plurality of remote servers, a plurality of additional local trust scores for the blockchain address. The method includes determining a consensus trust score based on the local node trust score and the plurality of additional local trust scores. Additionally, the method includes receiving a trust request for the blockchain address from a requesting device and sending the consensus trust score for the specified blockchain address to the requesting device.

24 Claims, 22 Drawing Sheets

(58) Field of Classification Search
USPC .......................................................... 705/75
See application file for complete search history.

(56) References Cited

U.S. PATENT DOCUMENTS

| | | | |
|---|---|---|---|
| 9,852,427 B2 | 12/2017 | Caldera | |
| 2006/0212931 A1 | 9/2006 | Shull et al. | |
| 2014/0046818 A1 | 2/2014 | Chung et al. | |
| 2015/0287026 A1 | 10/2015 | Yang et al. | |
| 2015/0363772 A1 | 12/2015 | Ronca et al. | |
| 2015/0363777 A1 | 12/2015 | Ronca et al. | |
| 2015/0363783 A1* | 12/2015 | Ronca et al. | G06Q 20/40 |
| 2016/0071108 A1* | 3/2016 | Caldera et al. | G06Q 20/40 |
| 2017/0270527 A1* | 9/2017 | Rampton | G06Q 20/40 |
| 2018/0357683 A1* | 12/2018 | Pickover et al. | G06Q 30/02 |
| 2019/0172067 A1* | 6/2019 | Arora et al. | G06Q 20/40 |

OTHER PUBLICATIONS

Andreas Gruener, et al., A Quantifiale Trust Model for Blockchain-based Identity Management, Jul. 2018, IEEE. (Year: 2018).*

Buechler, M. et al., "Decentralized Reputation System for Transactions Networks," 2015, https://pdfs.semanticscholar.org/567c/d3ba14fc170d798e34ae13f167ac8d1f2c02.pdf, accessed on Jun. 6, 2019, 9 pages.

Greenfield, R., "Reputation on the Blockchain," Nov. 20, 2017, https://medium.com/@robertgreenfieldiv/reputation-on-the-blockchain-624947b36897, accessed on Jun. 6, 2019, 5 pages.

King, S. et al., "PPCoin: Peer-to-Peer Crypto-Currency with Proof-of-Stake," Aug. 19, 2012, https://whitepaperdatabase.com/peercoin-ppc-whitepaper/, accessed on Jun. 6, 2019, 6 pages.

Kisagun, C., "Building On-chain Reputation," Apr. 10, 2018, https://blog.enigma.co/building-on-chain-reputation-79139abe1730, accessed on Jun. 6, 2019, 6 pages.

Konstantopoulos, G., "Understanding Blockchain Fundamentals, Part 1: Byzantine Fault Tolerance," Nov. 30, 2017, https://medium.com/loom-network/understanding-blockchain-fundamentals-part-1-byzantine-fault-tolerance-245f46fe8419, accessed on Jun. 6, 2019, 8 pages.

Nakamoto, S., "Bitcoin: A Peer-to-Peer Electronic Cash System," published 2018, https://bitcoin.org/bitcoin.pdf, accessed on Jun. 6, 2019, 9 pages.

PCT International Search Report and Written Opinion dated May 10, 2019 for International Application No. PCT/US2019/021087, 12 pages.

Rouse, M., "Consensus algorithm," What is consensus algorithm?—Definition from WhatIs.com, Dec. 6, 2017, https://web.archive.org/web/20171206231545/http://whatis.techtarget.com/definition/consensus-algorithm, accessed on Jun. 6, 2019, 1 page.

Tar, A., "Proof-of Work, Explained," Jan. 17, 2018, https://cointelegraph.com/explained/proof-of-work-explained, accessed on Jun. 6, 2019, 7 pages.

Wikipedia—Proof-of-stake, https://web.archive.org/web/20180206112920/https://en.wikipedia.org/wiki/Proof-of-stake, Feb. 6, 2018, accessed on Jun. 6, 2019, 4 pages.

Witherspoon, Z., "A Hitchhiker's Guide to Consensus Algorithms," Feb. 12, 2018, https://hackernoon.com/a-hitchhikers-guide-to-consensus-algorithms-d81aae3eb0e3, accessed on Jun. 6, 2019, 9 pages.

PCT International Search Report and Written Opinion dated Jul. 31, 2019 for International Application No. PCT/US2019/035198, 11 pages.

* cited by examiner

| Staked UTOKEN | 0 | 100k | 1M | 10M | 100M |
|---|---|---|---|---|---|
| Cost per Score | x | .95x | .9x | .85x | .8x |

FIG. 10A

| Node Services | Level 1 Node | Level 2 Node | Level 3 Node |
|---|---|---|---|
| Deliver Trust Scores | Yes | No | No |
| Add Evidence of Fraud | Yes | No | No |
| Deliver Fraud Alerts | Yes | Yes | No |
| Manage Trust Score Updates and Consensus | Yes | Yes | No |
| Calculate Trust Scores | Yes | Yes | No |
| Add Evidence of Custody | Yes | Yes | No |
| Validate and Store Evidence of Fraud | Yes | Yes | Yes |
| Validate and Store Evidence of Custody | Yes | Yes | Yes |

FIG. 10B

| Nodes | 100 | 200 | 300 | 400 | 500 | 600 | 700 | 800 | 900 | 1000 |
|---|---|---|---|---|---|---|---|---|---|---|
| Cliques | 100 | 200 | 300 | 400 | 500 | 600 | 700 | 800 | 900 | 1000 |
| Overlap | 5 | 7.5 | 10 | 12.5 | 15 | 17.5 | 20 | 22.5 | 25 | 27.5 |
| P(Address A) | .05% | .038% | .033% | .031% | .030% | .029% | .029% | .028% | .028% | .028% |

FIG. 10C

| UTOKEN Staking amounts for level 1 nodes | Minimum Nodes[3] | Maximum Nodes[4] | Minimum Nodes[3] | Maximum Nodes[4] |
|---|---|---|---|---|
| | 35% of initial UTOKEN | | 50% of initial UTOKEN | |
| 3,500,000 | 100.00 | 100.00 | 142.86 | 314.29 |
| 700,000 | 500.00 | 2,100.00 | 714.29 | 3,171.43 |
| 350,000 | 1,000.00 | 4,600.00 | 1,428.57 | 6,742.86 |
| 175,000 | 2,000.00 | 9,600.00 | 2,857.14 | 13,885.71 |
| 116,667 | 3,000.00 | 14,600.00 | 4,285.71 | 21,028.57 |
| 87,500 | 4,000.00 | 19,600.00 | 5,714.29 | 28,171.43 |
| 70,000 | 5,000.00 | 24,600.00 | 7,142.86 | 35,314.29 |

[3] Minimum nodes is when all nodes are level 1
[4] Maximum nodes is when 100 nodes are level 1 and the rest are level 3

DECENTRALIZED SAFEGUARD AGAINST FRAUD

CROSS-REFERENCE TO RELATED APPLICATIONS

This application claims the benefit of U.S. Provisional Application No. 62/680,017, filed on Jun. 4, 2018. The disclosure of the above application is incorporated herein by reference in its entirety.

FIELD

The present disclosure relates to providing safeguards against fraud in blockchain transactions.

BACKGROUND

Cryptocurrencies (e.g., Bitcoin) may provide a medium of exchange for pseudonymous/anonymous cryptocurrency transactors. Cryptocurrencies may operate on a decentralized network of computing devices that each operate according to a blockchain protocol. The decentralized network may control a blockchain transaction ledger that includes a list of transactions between different blockchain addresses. The transactions on the decentralized network may be verified through cryptography. Transactors may interact with the decentralized network using wallet applications. In some cases, the transactors may interact with the decentralized network via a digital currency exchange.

SUMMARY

In one example, a method comprises acquiring, at a node server, blockchain data for a blockchain address on a blockchain network. The blockchain data includes a plurality of transactions for the blockchain address. The method further comprises generating a local node trust score for the blockchain address based on the blockchain data for the blockchain address. The local node trust score indicates a likelihood that the blockchain address is involved in fraudulent activity. The method further comprises receiving, from a plurality of remote servers, a plurality of additional local trust scores for the blockchain address. Additionally, the method comprises determining a consensus trust score based on the local node trust score and the plurality of additional local trust scores. The consensus trust score indicates a consensus value for the local node trust score among the node server and the plurality of remote servers. The method further comprises receiving a trust request for the blockchain address from a requesting device and sending the consensus trust score for the specified blockchain address to the requesting device.

In one example, a system comprises one or more memory components and one or more processing units. The memory components are configured to store blockchain data for a blockchain address on a blockchain network. The blockchain data includes a plurality of transactions for the blockchain address. The one or more processing units are configured to execute computer-readable instructions that cause the one or more processing units to generate a local node trust score for the blockchain address based on the blockchain data for the blockchain address. The local node trust score indicates a likelihood that the blockchain address is involved in fraudulent activity. The one or more processing units are configured to receive, from a plurality of remote servers, a plurality of additional local trust scores for the blockchain address. The one or more processing units are configured to determine a consensus trust score based on the local node trust score and the plurality of additional local trust scores. The consensus trust score indicates a consensus value for the local node trust score. The one or more processing units are configured to receive a trust request for the blockchain address from a requesting device and send the consensus trust score for the specified blockchain address to the requesting device.

BRIEF DESCRIPTION OF THE DRAWINGS

The present disclosure will become more fully understood from the detailed description and the accompanying drawings.

FIG. 10A illustrates an example relationship of staked token and consensus trust score cost.

FIG. 10B illustrates example services associated with different levels of nodes.

FIG. 10C illustrates an example relationship between the number of nodes, the number of cliques, the address overlap, and the probability that a node will get a single address in their control.

FIG. 10D illustrates sample token staking amounts and number of nodes.

In the drawings, reference numbers may be reused to identify similar and/or identical elements.

DETAILED DESCRIPTION

Figure 1A:
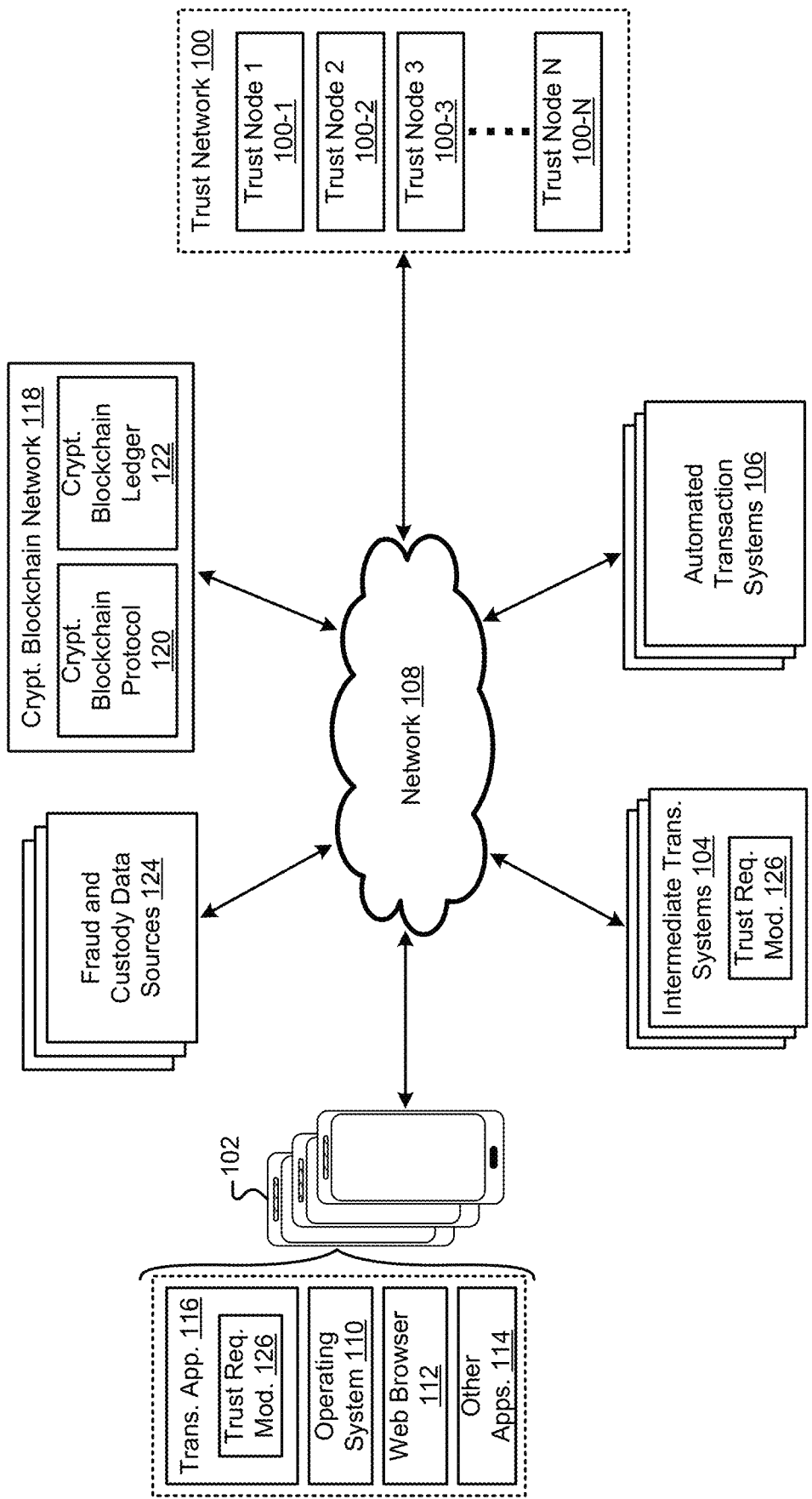
FIGS. 1A-1E illustrate an example trust network in communication with cryptocurrency transactor computing devices, intermediate transaction systems, and automated transaction systems.

Although cryptocurrencies have experienced growth, the mainstream utility of cryptocurrencies as a medium of exchange may be more limited due to lack of payer protections. For example, cryptocurrency funds sent to a fraudulent party may not be readily recovered. A trust network 100 of the present disclosure generates consensus trust scores for cryptocurrency transactors. The consensus trust scores can offer cryptocurrency transactors a safeguard against fraud while preserving user anonymity and autonomy. The consensus trust scores may provide a baseline level of trust upon which other security layers can be built, including cryptocurrency payment insurance, protection, and restitution.

A trust network 100 generates consensus trust scores for cryptocurrency transactors. For example, for a cryptocurrency based on blockchain technology, the trust network 100 can generate consensus trust scores for different blockchain addresses that interact on the blockchain. The trust network 100 may determine the consensus trust scores based on data retrieved from various data sources (e.g., fraud/custody data) along with blockchain data upon which the cryptocurrency is based. A trust score (e.g., a consensus trust score) may be a number (e.g., a decimal or integer) that indicates a likelihood that the blockchain address is involved in fraudulent activity. Put another way, a trust score can represent the propensity of a blockchain address to be involved with fraudulent activity.

A cryptocurrency transactor can request consensus trust scores from the trust network 100 before engaging in a cryptocurrency blockchain transaction in which funds (e.g., cryptocurrency blockchain tokens) are transacted on the blockchain. In general, a cryptocurrency transactor can use a consensus trust score to determine whether the blockchain address with which they are transacting is trustworthy. For example, a transactor that intends to send funds to a receiving party may request a consensus trust score for the receiving party. In this example, the transactor can use the consensus trust score for the intended receiver in order to evaluate the likelihood that the intended receiver is a fraudulent party.

Transactors can use consensus trust scores to take a variety of actions. For example, transactors may use consensus trust scores to determine whether to proceed with or cancel a blockchain transaction. As another example, transactors (e.g., digital exchanges) can use consensus trust scores to determine whether to insure a transaction. As another example, organizations can use consensus trust scores to decide whether to accept funds from a blockchain address. As such, the consensus trust scores described herein can help protect transactors from falling victim to fraud or from receiving fraudulent funds. Note that the consensus trust scores inform the transactors of the degree to which any cryptocurrency address may be trusted without requiring the transactor to know the identity of the party behind the address. As such, the consensus trust scores may preserve transactor anonymity.

FIG. 1A illustrates an example trust network 100 in communication with cryptocurrency transactor computing devices 102, 104, 106 (hereinafter "transactor computing devices") via a communication network 108. The network 108 may include various types of computer networks, such as a local area network (LAN), wide area network (WAN), and/or the Internet. The trust network 100 may include a plurality of trust nodes 100-1, 100-2, . . . , 100-N (referred to herein as "nodes"). Each of the nodes 100 may include one or more node computing devices (e.g., one or more server computing devices) that implement a variety of protocols described herein.

The nodes 100 may acquire data associated with cryptocurrency blockchain addresses and determine a variety of trust scores based on the acquired data. A trust score determined locally at a node based on the acquired data may be referred to as a "local node trust score" or a "local trust score." The nodes 100 may be configured to communicate their local trust scores among one another such that each node may have knowledge of local trust scores associated with other nodes. After a node acquires a plurality of local trust scores, the node may determine a candidate consensus trust score (hereinafter "candidate trust score") based on the plurality of local trust scores. One or more nodes may determine a consensus trust score based on the plurality of candidate trust scores. The consensus trust score may indicate a consensus value for a local trust score among a plurality of nodes. The consensus trust score for a cryptocurrency address can be written to a distributed consensus ledger and later retrieved from the trust network 100 (e.g., in response to a trust request).

The trust scores described herein (e.g., local, candidate, or consensus) can be calculated/provided in a variety of formats. In some implementations, a trust score may be an integer value with a minimum and maximum value. For example, a trust score may range from 1-7, where a trust score of '1' indicates that the blockchain address is likely fraudulent. In this example, a trust score of '7' may indicate that the blockchain address is not likely fraudulent (i.e., very trustworthy). In some implementations, a trust score may be a decimal value. For example, the trust score may be a decimal value that indicates a likelihood of fraud (e.g., a percentage value from 0-100%). In some implementations, a trust score may range from a maximum negative value to a maximum positive value (e.g., −1.00 to 1.00), where a larger negative value indicates that the address is more likely fraudulent. In this example, a larger positive value may indicate that the address is more likely trustworthy. The customer may select the trust score format they prefer.

The distributed trust network 100 described herein distributes the trust score computational workload across a plurality of nodes to produce a resilient network that is resistant to failure/outage and attack. In some implementations, the trust network 100 may include a built-in transactional autonomy moderated by a token (e.g., UTOKEN) that allows the trust network 100 to distribute the computational workload. Additionally, distributing trust calculations throughout the network may provide a resistance to fraud/conspiracy intended to corrupt the network.

The transactor computing devices 102, 104, 106 include computing devices that can interact with the trust network 100. Example transactor computing devices may include user transactor devices 102, such as smartphones, tablets, laptop computers, desktop computers, or other computing devices. A user transactor device 102 may include an operating system 110 and a plurality of applications, such as a web browser application 112 and additional applications 114.

A user transactor device 102 can include a transaction application 116 that can transact with a cryptocurrency blockchain network 118 (hereinafter "cryptocurrency network 118") to perform blockchain transactions. The transaction application 116 can also request consensus trust scores from the trust network 100. Some example transaction applications may be referred to as "wallet applications." In some cases, a transaction application may be referred to as a "decentralized wallet application" if the decentralized wallet application does not interact with centralized server-side components.

Additional example transactor devices may be included in intermediate transaction systems 104. An intermediate transaction system 104 (e.g., one or more server computing devices) may communicate with the cryptocurrency network 118, user transactor devices 102, and the trust network 100. An intermediate transaction system 104 can perform cryptocurrency transactions on behalf of the user transactor devices 102. The intermediate transaction system 104 can also acquire consensus trust scores from the trust network 100 on behalf of the user transactor devices 102. In some implementations, the intermediate transaction system 104 can provide a user interface for the user transactor devices 102 (e.g., via a web-based interface and/or an installed transaction application 116). An example intermediate transaction system 104 may include a digital currency exchange (e.g., Coinbase, Inc. of San Francisco Calif.). In some implementations, exchanges may be decentralized.

Additional example transactor devices may be included in automated transaction systems 106. An automated transaction system 106 (e.g., one or more server computing devices) may communicate with the trust network 100 and the cryptocurrency network 118. Example automated transaction systems 106 may include payment systems, such as a payment system or gateway that makes recurring payments (e.g., Stripe, Inc, of San Francisco Calif. or Plaid Inc, of San Francisco Calif.).

The transactor devices 102, 104, 106 can engage in transactions on the cryptocurrency network 118. A cryptocurrency network 118 may be formed by a network of computing devices that each operate according to a cryptocurrency blockchain protocol 120. The cryptocurrency network 118 may control a cryptocurrency blockchain transaction ledger 122 (hereinafter "cryptocurrency ledger 122"). The cryptocurrency ledger 122 includes a list of transactions between different cryptocurrency blockchain addresses. The cryptocurrency ledger 122 may also include additional data, such as transaction metadata. Example cryptocurrency networks 118 may include, but are not limited to, Bitcoin, Bitcoin Cash, Ethereum, and Litecoin. Although a single cryptocurrency network is illustrated in FIG. 1A, the trust network 100 can provide consensus trust scores for addresses on multiple different cryptocurrency blockchain networks using the techniques described herein.

A cryptocurrency ledger 122 may include cryptocurrency blockchain addresses that identify transactors on the cryptocurrency network 118. A transactor may refer to a party that controls transactions for a cryptocurrency blockchain address. For example, a transactor may include an individual or an organization, such as a business, a non-governmental organization, or a decentralized autonomous organization. A transactor can control one or more cryptocurrency blockchain addresses on a single cryptocurrency network. A transactor can also have one or more cryptocurrency blockchain addresses on different cryptocurrency networks.

A transactor can initiate a blockchain transaction in which the transactor's blockchain address sends/receives funds to/from another blockchain address. A blockchain address that sends funds to another blockchain address may be referred to herein as a "blockchain sender address" or a "sender address." The blockchain address that receives funds may be referred to herein as a "blockchain receiver address" or a "receiver address."

Figure 1B:
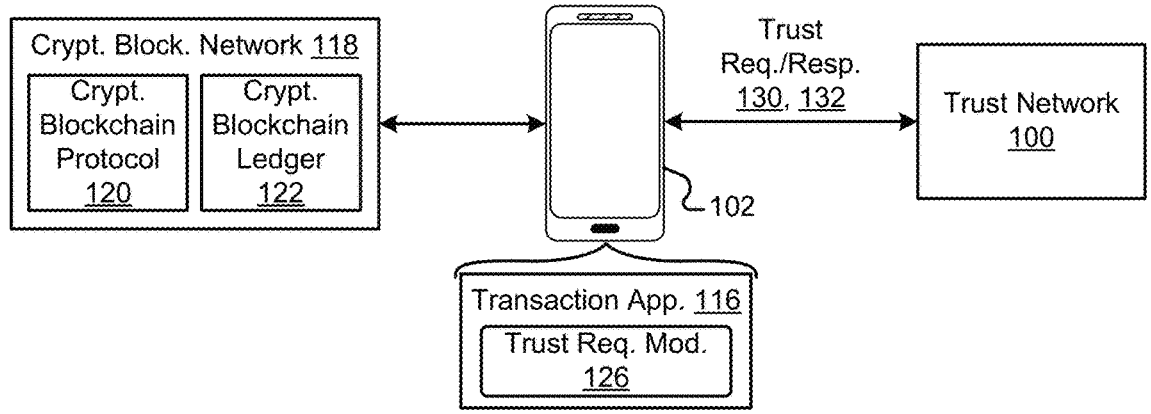
Figure 1C:
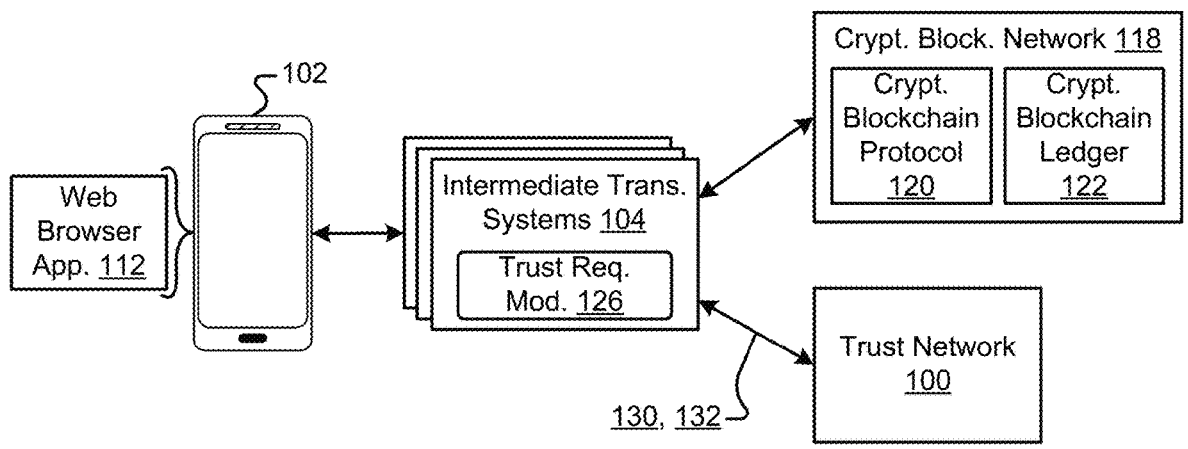
Figure 1D:
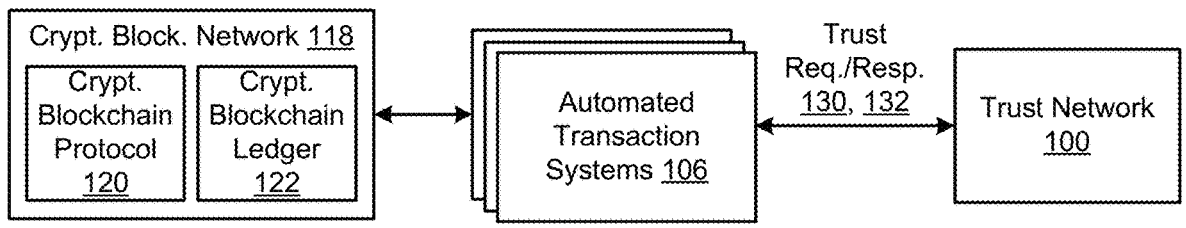

The transactor devices 102, 104, 106 can send trust requests to the trust network 100 and receive trust responses from the trust network 100 (e.g., see FIGS. 1B-1D). The trust request may indicate one or more cryptocurrency blockchain addresses for which the transactor would like a trust report (e.g., one or more consensus trust scores). In some implementations, the trust request can include a request payment, such as a blockchain token and/or fiat currency (e.g., United States Dollars). The request payment may be distributed to nodes in the trust network 100 as payment for providing the consensus trust score(s).

In one example, a transactor device can send a trust request to the trust network 100 and receive a trust response (e.g., trust report) from the trust network. The transactor device and trust network 100 may communicate via an application programming interface (API). The trust request may include a cryptocurrency blockchain address for the transactor on the other side of the transaction. For example, a trust request from a sender may request a trust report for the receiver's blockchain address. The sender may make a decision based on the received trust report, such as whether to engage in the cryptocurrency blockchain transaction with the receiver.

FIGS. 1B-1D illustrate interactions between different transactor devices/systems 102, 104, 106, the cryptocurrency network 118, and the trust network 100. In FIG. 1B, the user transactor device 102 includes a transaction application 116 (e.g., a wallet application) that transacts with the cryptocurrency network 118. The transaction application 116 includes a trust request module 126 that interfaces with the trust network 100. For example, the trust request module 126 can generate the trust request 130 (e.g., a web request). The trust request module 126 can also receive the trust response 132 from the trust network 100. In some implementations, the trust request module 126 can generate a graphical user interface (GUI) that the user may interact with in order to send the trust request 130 and view the trust report 132.

In FIG. 1C, a transactor device 102 can transact on the cryptocurrency network 118 via an intermediate transaction system 104. For example, in FIG. 1C, the transactor device 102 can include a web browser application 112 that interacts with the intermediate transaction system 104. The intermediate transaction system 104 (e.g., a web server) can provide an interface to the web browser 112 for transacting on the cryptocurrency network 118. The intermediate transaction system 104 may also provide an interface (e.g., a web-based interface) for the user to select whether the user wants a trust report before engaging in the blockchain transaction.

In FIG. 1D, an automated transaction system 106 controls transactions on the cryptocurrency network 118. The automated transaction system 106 can also request trust reports from the trust network 100. In some implementations, the transactions engaged in by the automated transaction system 106 may depend on the consensus trust scores reported by the trust network 100. For example, the automated transaction system 106 can engage in transactions if the trust score indicates that the address is unlikely to be engaged in fraudulent activity.

Although the devices/systems described herein may make a trust request 130 in order to receive consensus trust scores before making a cryptocurrency blockchain transaction, in some implementations, other devices/systems may request consensus trust scores in other scenarios. For example, compliance officers at an exchange may request consensus trust scores for compliance reasons.

Figure 1E:
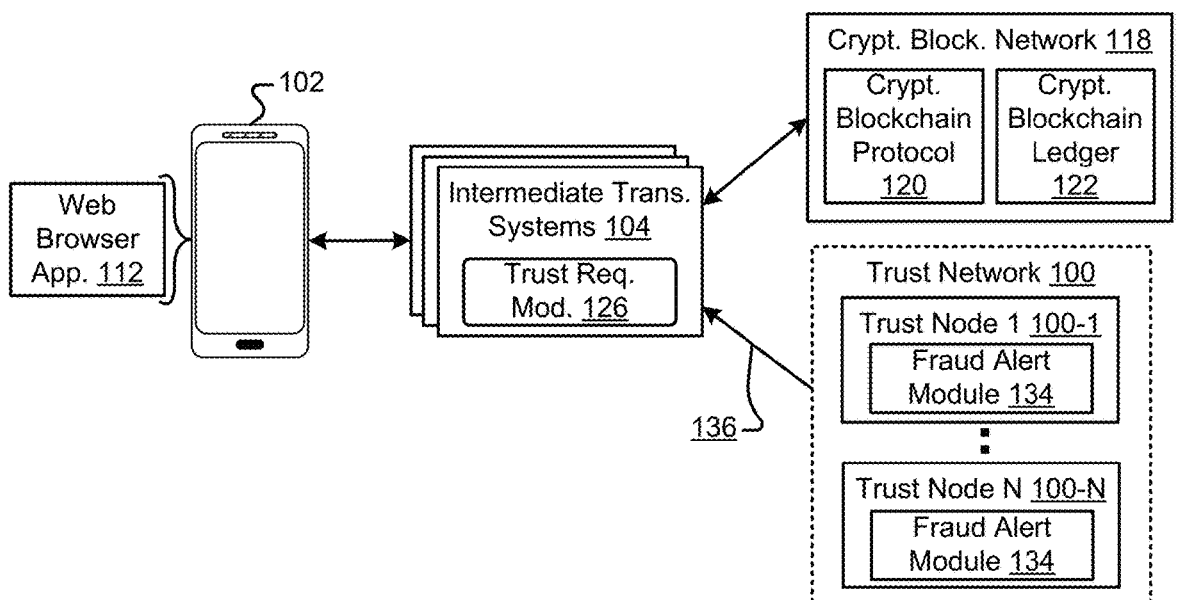

Referring to FIG. 1E, in some implementations, the trust network 100 may implement a fraud alert protocol that can automatically notify network participants (e.g., fraud alert requesting devices) of potentially fraudulent cryptocurrency blockchain addresses. For example, a node may include a fraud alert module 134 that is configured to provide fraud alerts 136 under a set of fraud alert criteria that may be configured by a user. In one example, a fraud alert module 134 may monitor one or more cryptocurrency addresses and provide a fraud alert 136 if the consensus trust score for any address drops below a threshold level of trustworthiness (e.g., as set by a user). In another example, a fraud alert 136 may be sent if a monitored trust score changes by more than a threshold percentage. In some implementations, a fraud alert protocol may be implemented using a smart contract that monitors a consensus trust score and provides alerts according to a set of business rules that may be defined by a user. In some implementations, a node may be required to stake an amount of UTOKEN to be eligible to receive fraud alerts.

In some implementations, nodes may be connected via a network of state channels. When a cryptocurrency transactor issues a trust request and payment (e.g., UTOKEN), the request can be gossiped until it reaches a node that has the requested consensus trust score. This node can return the consensus trust score to the cryptocurrency transactor. Payment can then be granted according to the reward protocol.

Example transactors may include, but are not limited to, a custodial exchange, a non-custodial exchange, a custodial wallet, a non-custodial wallet, a new token developer and seller, decentralized applications, blockchain enabled merchants, node operators, algorithm suppliers, and proof of work security providers.

A custodial exchange may refer to an entity (e.g., a company) that enables the exchange of cryptoassets while holding the assets on behalf of their customers. Custodial exchanges may use the consensus trust score to evaluate whether depositing cryptoassets are fraudulent, helping to ensure that their service is not used to launder money. Additionally, a custodial exchange may receive alerts to monitor the blockchain addresses they have in custody. A non-custodial exchange may refer to an entity (e.g., company) that enables the exchange of cryptoassets without holding the cryptoassets on behalf of the token purchaser or seller. Non-custodial exchanges may use the consensus trust score to evaluate the trustworthiness of a counterparty.

A custodial wallet may refer to an entity (e.g., a company) that holds private keys on behalf of customers and enables them to send and receive cryptoassets. Custodial wallets may use the consensus trust score to evaluate whether cryptoassets being deposited are fraudulent and to receive fraud alerts. They may also use the consensus trust score to protect their users from sending cryptoassets to fraudulent addresses. A non-custodial wallet may refer to an entity (e.g., a company) that makes software that allows individuals to hold and transact cryptoassets locally on personal devices. Non-custodial wallets may use the consensus trust score to protect their users from sending cryptoassets to fraudulent addresses and from receiving fraudulent funds.

A new token developer and seller may refer to an entity (e.g., a company or individual) that creates software that, when run by a network of peers, creates a new decentralized token. This company may also sell some initial distribution of the token to interested buyers. These transactors may perform an initial coin offering (ICO). A new token developer and seller may use the consensus trust score to ensure funds being used to purchase their token are not fraudulent, ensuring that they are selling tokens in a compliant manner.

A decentralized application may refer to an application that runs on a decentralized network. These may include applications that manage money, applications where money is involved but require another piece, and other applications, which includes voting and governance systems. Decentralized applications may use the consensus trust score for any activity involving the evaluation of counterparty trust, in addition to protecting participants against fraud.

A blockchain-enabled merchant may refer to an entity (e.g., a company) that accepts payment in the form of cryptoassets (e.g., security tokens). Blockchain-enabled merchants may use the consensus trust score to ensure funds being used as payment are not fraudulent. They may also receive alerts on the addresses with which they interact.

Referring back to FIG. 1A, the environment includes data sources 124 that the trust network 100 may use to determine whether blockchain addresses are fraudulent. Example data sources 124 described herein include fraud data sources and custody data sources. The trust network 100 may determine local trust scores based on the data included in the data sources 124 along with the data included in the cryptocurrency ledger 122.

Figure 2:
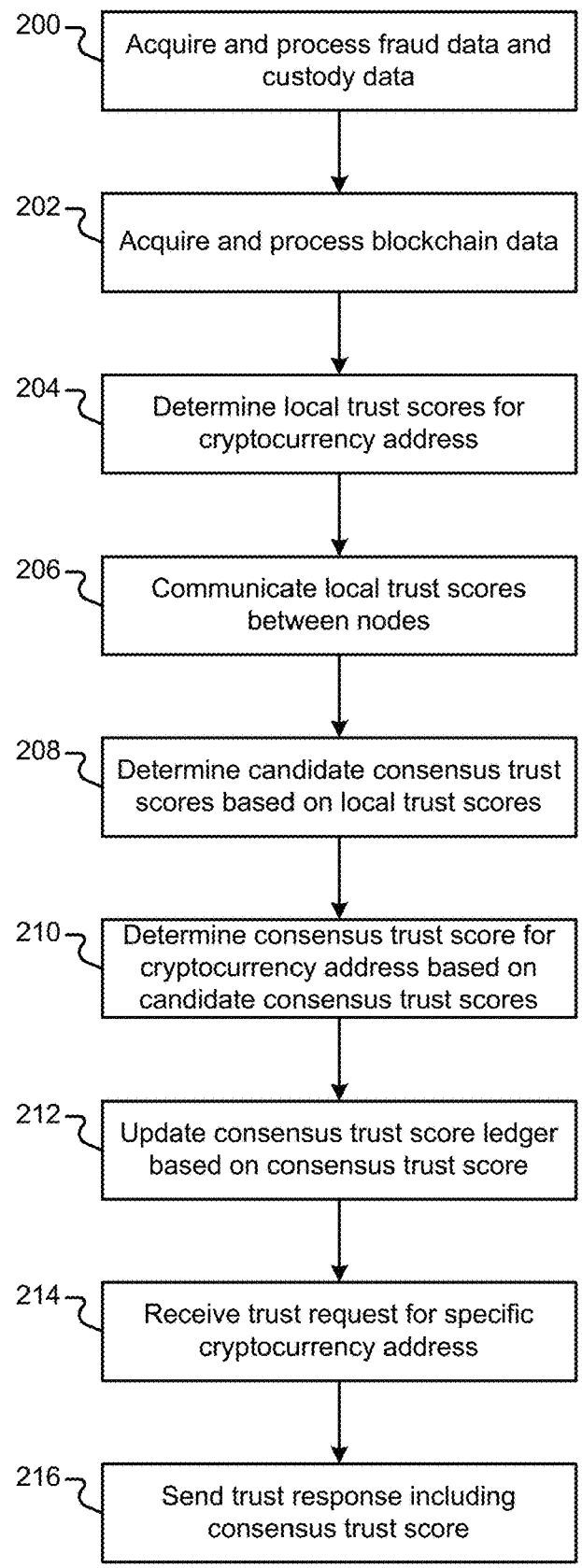
FIG. 2 is a method that describes operation of an example trust network.

FIG. 2 illustrates an example method that describes operation of the environment illustrated in FIGS. 1A-1D. For example, the method of FIG. 2 illustrates the determination of local trust scores, candidate trust scores, and a consensus trust score for a single cryptocurrency blockchain address. The method of FIG. 2 may be performed multiple times to determine local trust scores, candidate trust scores, and consensus trust scores for multiple cryptocurrency blockchain addresses.

In block 200, the nodes 100 acquire and process fraud and custody data 124 associated with a cryptocurrency address. In block 202, the nodes 100 acquire and process cryptocurrency blockchain data associated with the cryptocurrency address. In block 204, the nodes 100 each determine local trust scores for the cryptocurrency address based on the data acquired in blocks 200-202.

In block 206, the nodes 100 communicate the local trust scores for the cryptocurrency address with one another. After communication of the local trust scores, each of the nodes may include a plurality of local trust scores calculated by other nodes. In block 208, the nodes 100 determine candidate trust scores for the cryptocurrency address based on the local trust scores. In block 210, the nodes 100 determine a consensus trust score for the cryptocurrency address based on the candidate trust scores for the cryptocurrency addresses. In block 212, the nodes 100 can update a distributed consensus trust score ledger to include the calculated consensus trust score. In blocks 214-216, the trust network 100 receives a trust request 130 for the cryptocurrency address from a requesting device and sends a trust response 132, including the consensus trust score, to the requesting device.

Figure 3:
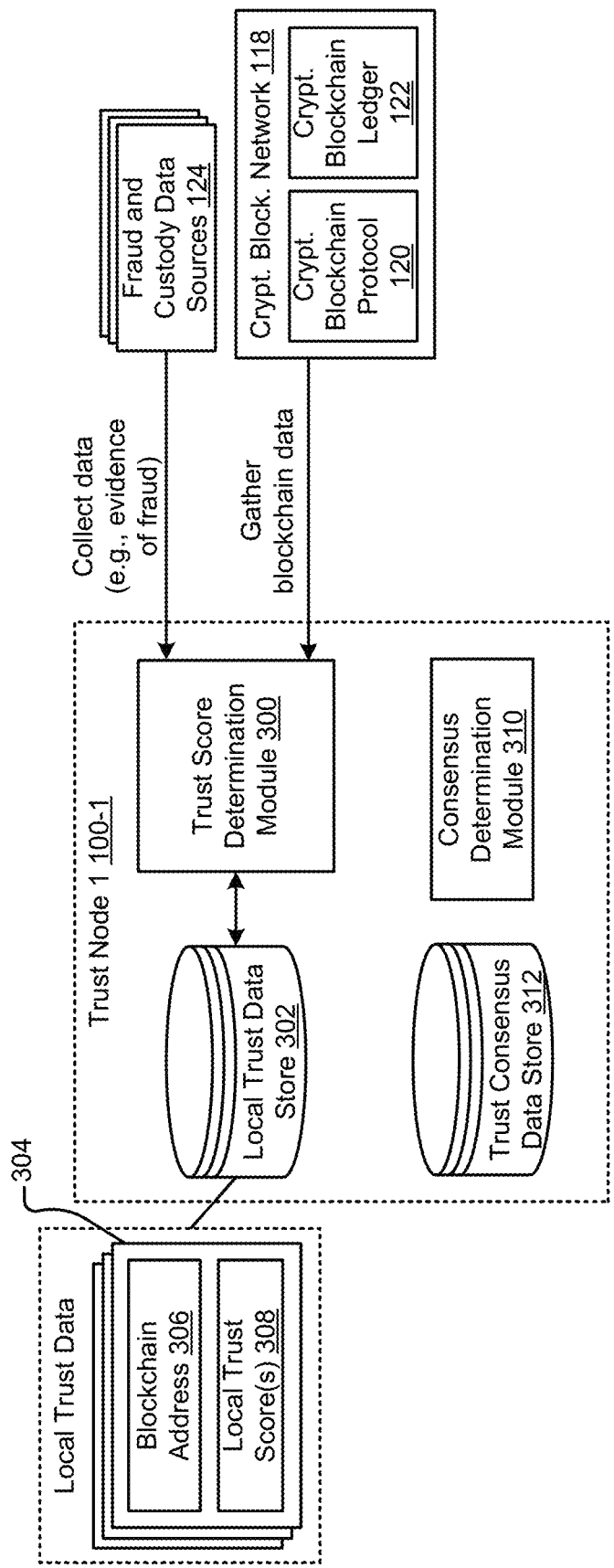
FIG. 3 is a functional block diagram of an example node that calculates local trust scores and consensus trust scores.
Figure 4A:
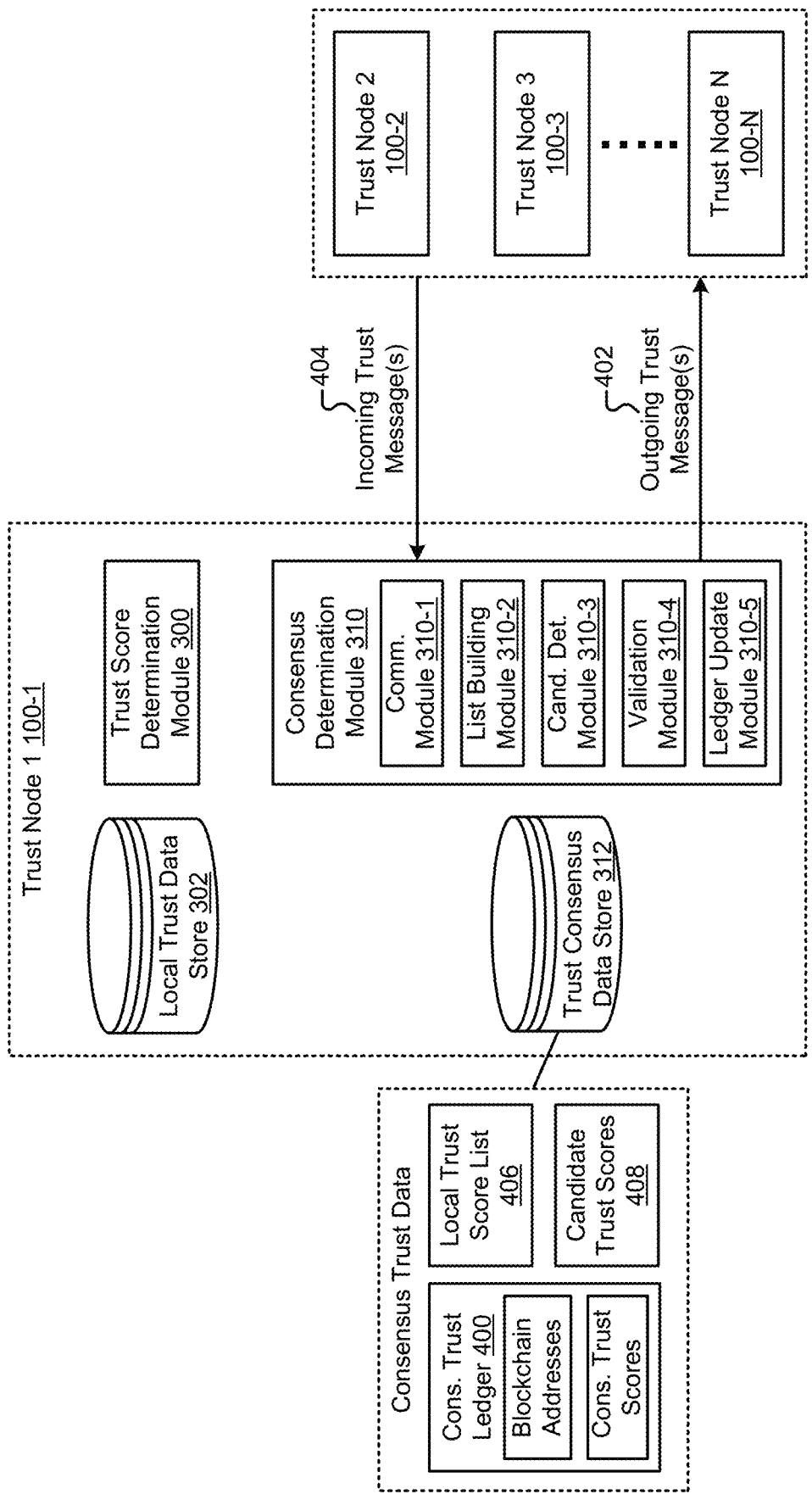
FIG. 4A is a functional block diagram of an example node that calculates consensus trust scores.
Figure 4B:
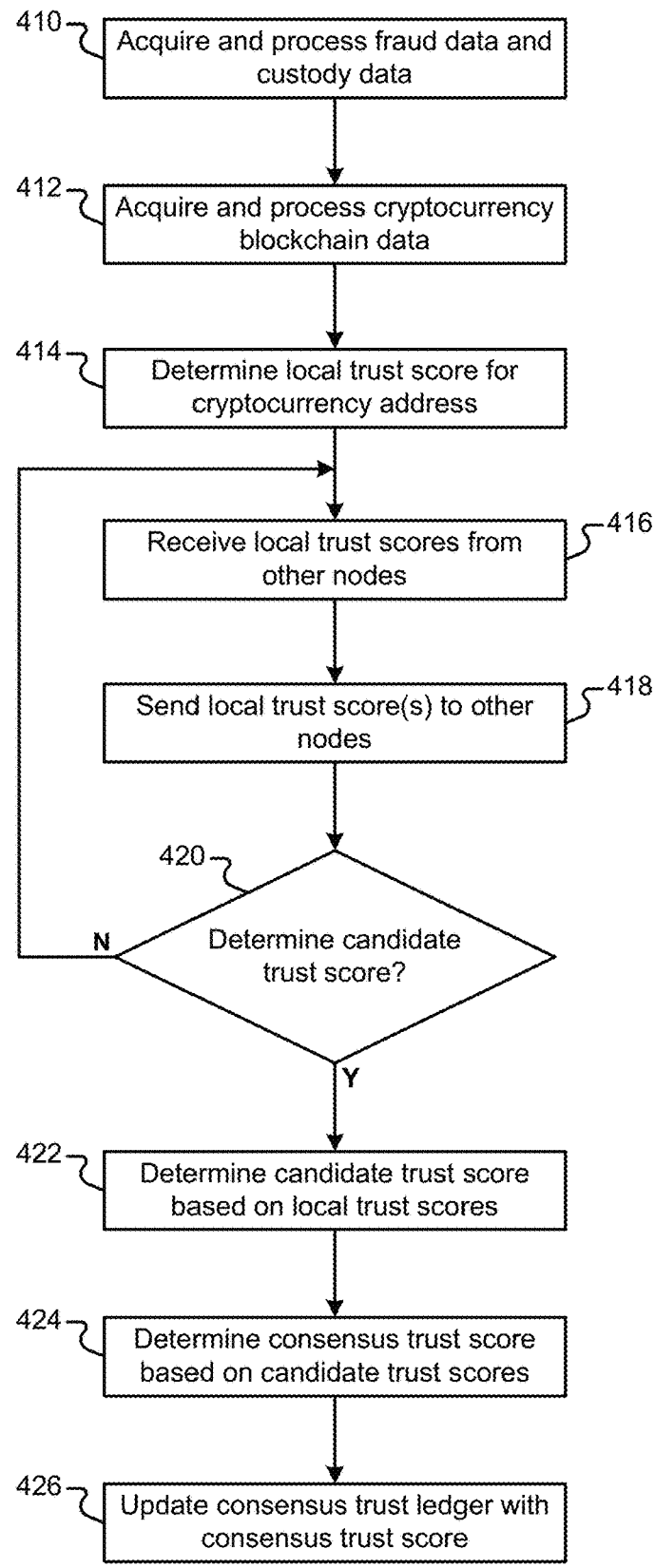
FIG. 4B is a flow diagram that illustrates an example method for calculating a consensus trust score.

FIG. 3 illustrates generation of local trust scores. FIGS. 4A-4B illustrate generation of consensus trust scores. In addition to generating trust scores, the trust network 100 may implement additional features described with respect to FIGS. 5-7. In some implementations, the trust network 100 may implement a reputation protocol that calculates and stores reputation values that indicate a variety of parameters associated with the nodes, such as an amount of work performed by the nodes (e.g., see FIG. 5).

In some implementations, the trust network 100 may implement a token economy that operates as a medium of exchange in the trust network 100. The token economy described herein uses a token referred to as "UTOKEN." Each of the nodes may implement a wallet module (e.g., see FIG. 6) that can send, receive, stake, and burn UTOKEN according to the protocols implemented in the trust network.

Figure 6:
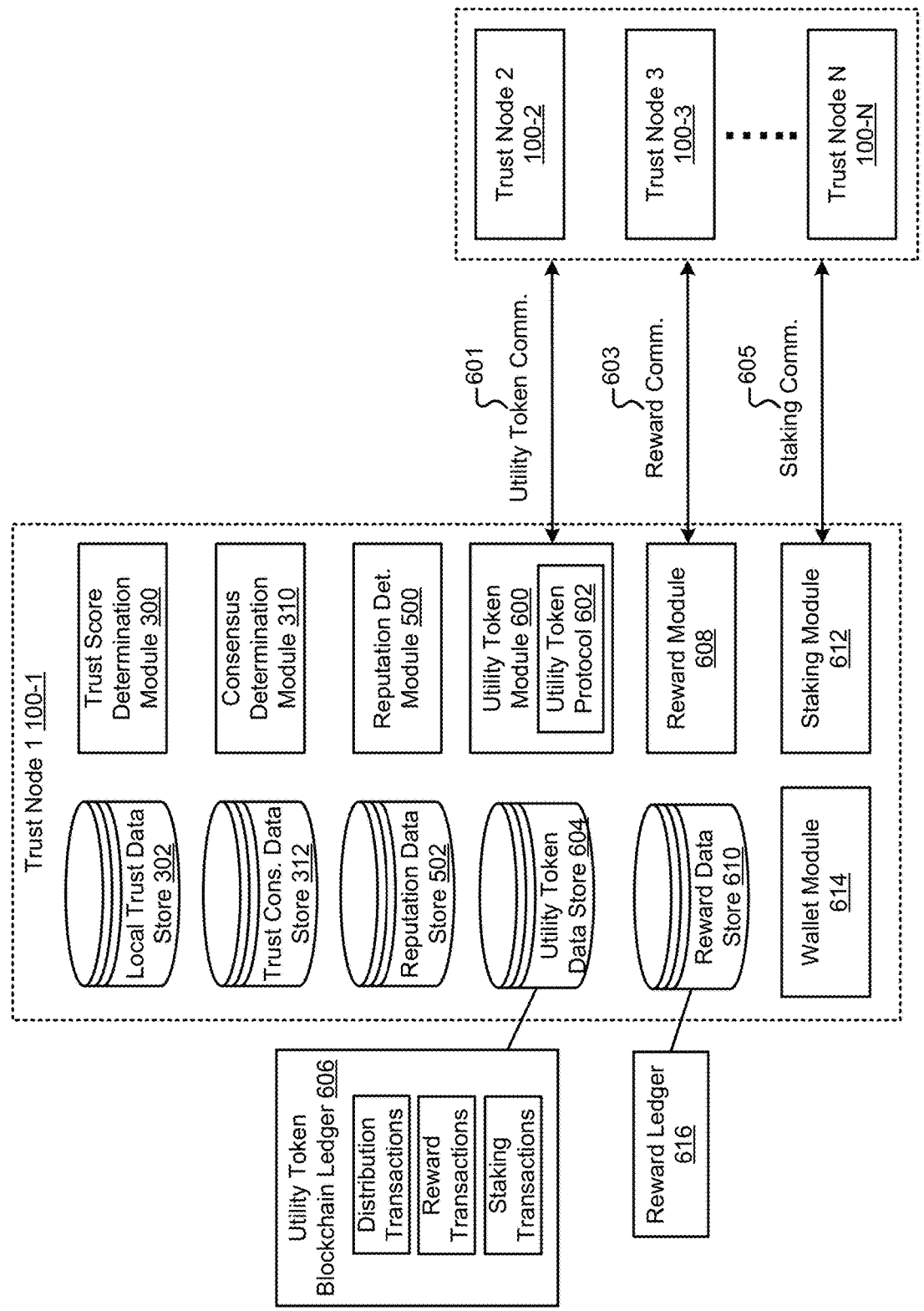
FIG. 6 is a functional block diagram of an example node that implements a token economy for a trust network.
Figure 7:
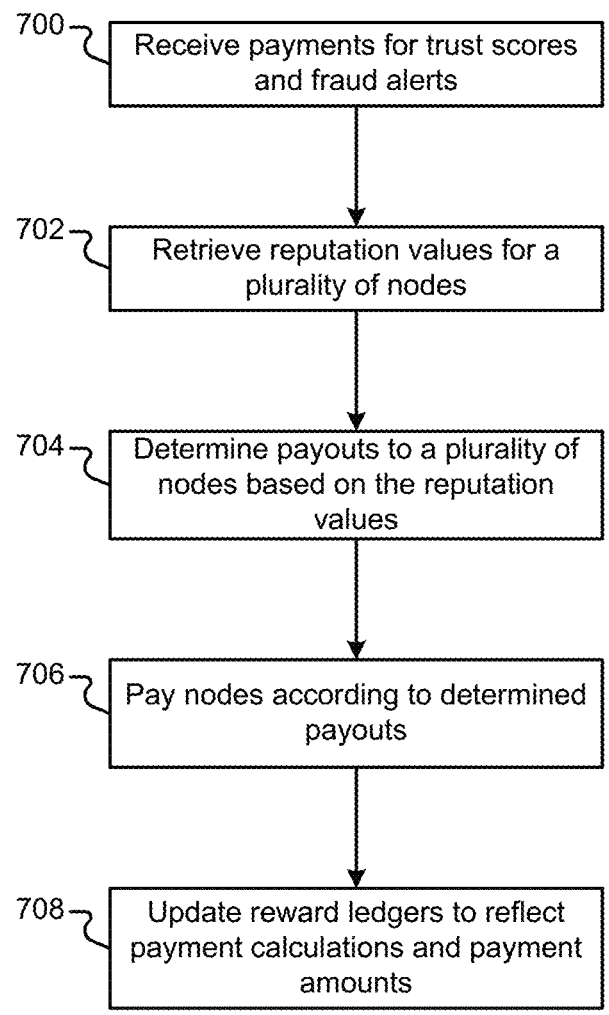
FIG. 7 illustrates an example method that describes operation of a reward protocol.

In some implementations, the trust network 100 may implement a reward protocol that tracks various parameters of the nodes (e.g., an amount of work) and rewards the nodes using UTOKEN (e.g., see FIGS. 6-7). The trust network 100 may also implement a staking protocol that determines the functionality of the nodes and penalizes certain node behaviors (e.g., the production of fraudulent data).

Different nodes in the trust network 100 may be configured to implement different features of the trust network 100. For example, different nodes may be configured to implement different protocols, or portions of protocols, described herein. In some implementations, the staking protocol may determine which features the nodes may implement. The modules and data stores included in the nodes may represent the protocols implemented by the nodes and the data stored by the nodes. Each node may include one or more computing devices. In some implementations, multiple nodes may be run on a single computing device.

FIG. 3 illustrates an example node 100-1 that includes a trust score determination module 300 and a local trust data store 302. The trust score determination module 300 acquires and processes a variety of data described herein, such as fraud and custody data 124 along with blockchain data. The local trust data store 302 can store data for a plurality of cryptocurrency addresses.

The data associated with a single cryptocurrency address is illustrated herein as a blockchain address record 304. The local trust data store 302 may include a plurality of such blockchain address records, each for a different cryptocurrency address. Each blockchain address record 304 can include a blockchain address 306 that uniquely identifies the record 304. Each blockchain address record 304 can also include a local trust score 308 associated with the blockchain address 306. The blockchain address record 304 may include a history of local trust scores calculated over time for the blockchain address.

The blockchain address record 304 described herein represents data stored in the local trust data store 302. The node 100-1 may include a variety of different data structures that are used to implement the data. Accordingly, the blockchain address record 304 may be implemented using one or more different data structures than explicitly illustrated herein.

In FIG. 3, the trust score determination module 300 acquires and processes a variety of types of data, such as custody data and fraud data 124. Example fraud and custody data may include data that provides evidence of fraud with respect to a cryptocurrency address and/or indicates the party that owns/controls the cryptocurrency address. The trust score determination module 300 may store custody and fraud data related to a cryptocurrency address in the blockchain address record 304. The trust score determination module 300 may also generate a fraud label that indicates whether the cryptocurrency address is likely fraudulent based on the acquired fraud data.

The trust score determination module 300 acquires and processes blockchain data (e.g., the cryptocurrency ledger 122). The trust score determination module 300 may store raw and processed blockchain data relevant to a cryptocurrency address in the blockchain address record 304. Example cryptocurrency blockchain data may include data for a plurality of blockchain transactions between a plurality of different cryptocurrency addresses.

The trust score determination module 300 determines local trust scores for the cryptocurrency addresses based on the acquired blockchain data and fraud/custody data. In some implementations, the trust score determination module 300 may generate a blockchain graph data structure based on the blockchain data (e.g., see FIG. 15B). The trust score determination module 300 may also process the graph to determine one or more graph-based values (e.g., importance values) that may be used to generate local trust scores.

In some implementations (e.g., see FIG. 16), the trust score determination module 300 may generate scoring features for cryptocurrency addresses and generate one or more scoring models based on the scoring features and other data (e.g., labeled fraud data). In these implementations, the trust score determination module 300 may generate one or more local trust scores for blockchain addresses using one or more scoring models and the scoring features associated with the blockchain addresses. FIGS. 11-17 illustrate a more detailed implementation of the trust score determination module 300 and the local trust data store 302.

A plurality of nodes can communicate with one another in order to come to a consensus trust score for a cryptocurrency address. Each node may be identified (e.g., uniquely identified) by a node identifier (ID). In some implementations, a public/private key pair is generated upon inception of a node. In these implementations, a node's public key may serve as a node ID, although other identifiers may be used.

Different nodes may compute the same/similar local trust scores in cases where the different nodes have access to the same/similar cryptocurrency blockchain data and fraud/custody data. In some cases, the local trust scores may differ among nodes. For example, the local trust scores may differ when nodes have access to different fraud and custody data. In a specific example, nodes located in different jurisdictions (e.g., countries) may have access to data sources that are blocked in other jurisdictions. In another specific example, some nodes may access information at different rates.

The nodes 100 implement a trust consensus protocol that determines consensus trust scores for cryptocurrency addresses. The consensus trust scores can be stored in a consensus trust score ledger 400 that is distributed to nodes across the trust network 100. FIG. 4A illustrates an example node 100-1 that includes a consensus determination module 310 and a trust consensus data store 312 (hereinafter "consensus data store 312"). The trust network 100 can include a plurality of nodes that include the functionality described with respect to FIGS. 4A-4B. The consensus determination module 310 can communicate with other consensus determination modules (e.g., via communication module 310-1) of other nodes to determine consensus trust scores. The consensus data store 312 includes the consensus trust scores and other data in a consensus trust score ledger 400.

The consensus determination module 310 can communicate with other nodes (e.g., consensus modules of other nodes). For example, each node may communicate its local trust score to other nodes via outgoing trust consensus messages 402. Additionally, each node may receive local trust scores from other nodes via incoming trust consensus messages 404. An example trust consensus message may include a node ID, a node IP address, a cryptocurrency blockchain address and an associated local trust score. In some cases, instead of indicating an associated local trust score, a trust consensus message may indicate that a local trust score has not been calculated or is in the process of being calculated.

The consensus determination module 310 can generate a local trust score list 406 ("trust score list 406") based on the local trust scores received from other nodes (e.g., using list building module 310-2). The trust score list 406 may include a list of node IDs and corresponding local trust scores for a cryptocurrency address. The consensus determination module 310 may generate a local trust score list 406 for each cryptocurrency address. Each node can communicate its trust score list to other nodes. For example, a node can send/receive trust score messages that include trust score lists. A node can update the local trust score list based on other received trust score lists.

Each node in the trust network 100 may be configured to communicate with different sets of nodes. Put another way, nodes in the trust network 100 may be configured to communicate with non-overlapping sets of nodes. Since different nodes may communicate with different sets of other nodes, eventually, each of the nodes communicating local trust scores with one another may have knowledge of other nodes' local trust score calculations. In this scenario, different nodes may include similar trust score lists. In some examples, the trust scores in the trust score lists may converge in fractions of a second or a matter of seconds.

The trust score list 406 for a cryptocurrency address may include a frequency (count) distribution of local trust scores. In some cases, the trust score list 406 may include a large number of local trust scores within a tight grouping. In some cases, a trust score list 406 may include outlier trust scores that have values outside of a major grouping. For example, an outlier may be due to variations in information used to produce the local trust scores. As another example, one or more outliers may be caused by nodes that are producing/distributing fraudulent trust scores. As described herein, nodes that produce/distribute fraudulent trust scores may be held accountable (e.g., via burning of staked funds).

The consensus determination module 310 determines a candidate trust score based on the local trust scores included in the trust score list 406 (e.g., using candidate determination module 310-3). In some implementations, the consensus determination module 310 may include "candidate determination criteria" that trigger the determination of a candidate trust score. Example candidate determination criteria may include the presence of local trust scores for a threshold number of nodes and/or a threshold fraction of nodes. For example, the consensus determination module 310 may determine a candidate trust score in response to the presence of a threshold number/fraction of local trust scores included in the trust score list.

In some implementations, the consensus determination module 310 may determine a candidate trust score in response to the distribution pattern of trust scores in the trust score list. For example, the consensus determination module 310 may be triggered to determine a candidate trust score when the trust scores are centered in a distribution (e.g., tightly centered in a single distribution). If the trust score distribution includes outliers, the consensus determination module 310 may continue communicating local trust scores with the other nodes. In a specific example, the consensus determination module 310 may be triggered to determine a candidate trust score when the variance of a distribution is less than a threshold variance. In cases where there are multiple modes of distribution, the consensus determination module 310 may determine whether the modes are valid or whether the modes are due to fraudulent trust scores. Similarly, if the variance of the distribution is too great (e.g., greater than a threshold value), the consensus determination module 310 may determine whether the variance is due to variations in calculations and/or fraudulent behavior. The consensus determination module 310 may filter out (i.e., remove) trusts scores that are attributable to fraudulent behavior before determining a candidate trust score.

The consensus determination module 310 can determine the candidate trust score using a variety of techniques. In some implementations, the consensus determination module 310 may remove outlier local trust scores from the trust score list before determining the candidate trust score. The consensus determination module 310 may determine the candidate trust score based on an average (e.g., a blended average) of the remaining local trust scores in the trust score list 406. For example, the consensus determination module 310 may determine the candidate trust score by using a statistically weighted average of local trust scores based on node count.

The nodes may communicate the candidate trust scores between one another. The nodes may also store the candidate trust scores 408. A set of consensus determination modules can determine a consensus trust score for a cryptocurrency address based on a plurality of candidate trust scores 408. In some implementations, consensus determination modules may monitor the candidate trust scores to determine whether the candidate trust scores are converging on a similar trust score. The consensus determination modules may be configured to determine a consensus trust score in response to one or more consensus triggers associated with the candidate trust scores. For example, the consensus determination modules may be configured to determine a consensus trust score if greater than a threshold number/fraction of candidate trust scores are in agreement (e.g., within a threshold variance).

In some implementations, the consensus determination modules may perform validation operations associated with the candidate trust scores (e.g., using validation module 310-4). For example, the consensus determination modules may perform error checking of the candidate trust scores. The error checking operations may include verifying whether communication of local trust scores actually occurred for the candidate scores or whether a conspiracy occurred that led to the candidate scores. In some implementations, the consensus determination modules can query a plurality of nodes that participated in communication of local trust scores and determination of candidate scores to determine what the plurality of nodes communicated to one another. In some implementations, the nodes may elect a leader node to perform the error checking operations and determine whether the nodes are in agreement.

After validating the candidate trust scores, the consensus determination module 310 may calculate the consensus trust score. In some implementations, the consensus determination modules may determine the consensus trust score based on an average (e.g., a blended average) of the candidate trust scores. For example, the consensus determination modules may determine the consensus trust score by using a statistically weighted average of candidate trust scores based on count. The consensus determination module 310 may then update the consensus ledger 400 with the consensus trust score. The consensus determination module 310 may then distribute the updated ledger to other nodes (e.g., using the ledger update module 310-5). In some implementations, only a subset of the nodes can write trust scores and other data to the consensus ledger 400, although nodes that do not participate in generating the consensus ledger 400 may receive updated versions of the consensus ledger 400.

The consensus ledger 400 includes consensus trust scores for different cryptocurrency addresses over time. The consensus trust scores included in the consensus ledger 400 may be provided to trust score requestors. The consensus ledger 400 can also include timing data that indicates when the consensus trust scores were written to the ledger 400. For a determined consensus trust score, the consensus ledger may include validation information associated with the consensus trust score, such as the candidate trust scores used for the consensus trust score and the nodes that were validated.

Storing the validation information for a consensus trust score may allow the nodes to review how the consensus trust scores were validated.

The nodes 100 may be configured to generate new trust scores for new cryptocurrency addresses and update the trust scores over time. For example, the trust score determination modules may be configured to generate/update local trust scores for cryptocurrency addresses. As another example, the consensus determination modules may be configured to generate/update candidate trust scores and consensus trust scores over time. The frequency of updates can be set by the consensus protocol. In some cases, data associated with cryptocurrency addresses may change over time. In some cases, data included in the cryptocurrency blockchain may change over time. The trust score determination modules and consensus determination modules may be configured to generate new trust scores in response to such changes in data.

In some implementations, the consensus determination modules may communicate new local trust scores and/or updated local trust scores to other nodes. For example, the consensus determination modules may communicate updates in local trust scores to other nodes if the update resulted in greater than a threshold amount of change in the local trust score. Updates to the local trust scores may cause changes in candidate trust scores. In turn, changes to candidate trust scores may cause a change in consensus trust scores and the consensus ledger. In this manner, the consensus ledger 400 may reflect the history of consensus trust scores over time for a plurality of cryptocurrency addresses.

Different nodes may have different levels of functionality with respect to the calculation of trust scores. The differing functionality may be based on the amount of value (e.g., UTOKEN) staked by the nodes, where a greater staked amount can authorize more functionality. In some implementations, all nodes may be authorized to buy trust scores and include copies of consensus ledgers. In these implementations, a subset of nodes may be configured to calculate local trust scores, candidate trust scores, and consensus trust scores. Additionally, the subset of nodes, or a further subset, may be configured to write consensus trust scores to the consensus ledger.

FIG. 4B illustrates an example method that describes calculation of a consensus trust score from the perspective of an example node 100-1. The method of FIG. 4B may be performed multiple times to determine local trust scores, candidate trust scores, and consensus trust scores for multiple cryptocurrency blockchain addresses.

In blocks 410-412, the trust score determination module 310 acquires and processes fraud and custody data 124 and cryptocurrency blockchain data. In block 414, the trust score determination module 310 determines a local trust score for a cryptocurrency address. In block 416, the consensus determination module 310 receives local trust scores from other nodes. In block 418, the consensus determination module 310 sends local trust scores to other nodes.

In block 420, the consensus determination module 310 determines whether to calculate a candidate trust score (e.g., based on candidate determination criteria). If the candidate determination criteria are not satisfied, the consensus determination module 310 may continue communicating local trust scores with other nodes in blocks 416-418. If the consensus determination module 310 determines that the candidate determination criteria are satisfied, in block 422, the consensus determination module 310 may determine a candidate trust score based on the local trust scores in the trust score list 406. In block 424, the consensus determination module 310 may determine a consensus trust score based on a plurality of candidate trust scores. In block 426, the consensus determination module 310 may update the consensus trust ledger 400 to include the consensus trust score.

Figure 5:
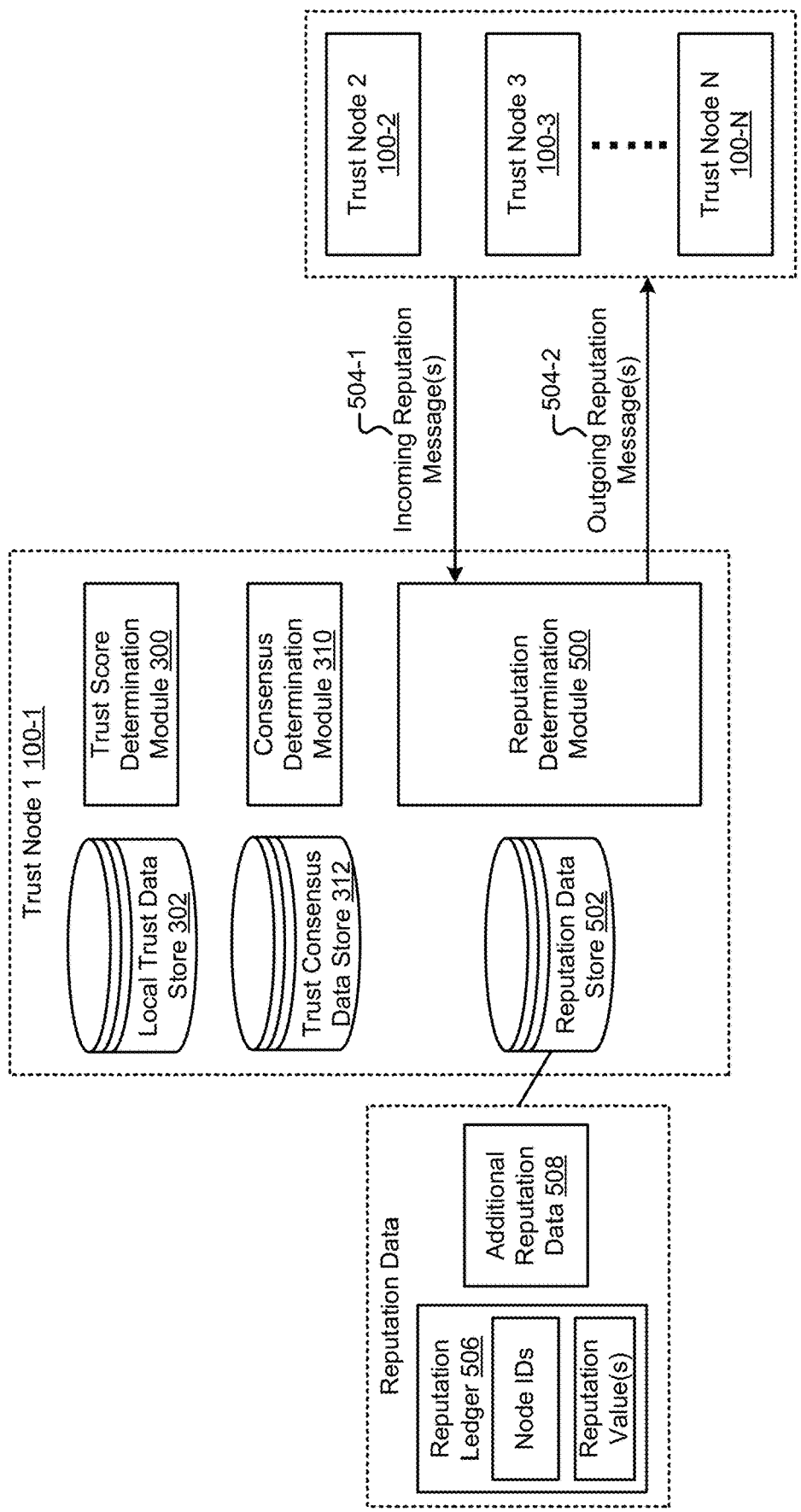
FIG. 5 is a functional block diagram of an example node that calculates reputation values.

Referring to FIG. 5, the trust network 100 may implement a reputation protocol in which a plurality of nodes each may compute one or more reputation values. The reputation values for a node may indicate a variety of parameters associated with the node, such as an amount of work the node performed during trust score calculations and distribution, the quality of the work performed (e.g., the accuracy), and the consistency of node operation (e.g., node uptime). The reputation values may be used by other protocols in the trust network 100. For example, nodes may determine candidate and/or consensus trust scores based on the reputation values associated with one or more nodes. As another example, the nodes may be awarded and/or punished according to their reputation values.

The node 100-1 includes a reputation determination module 500 that determines reputation values for the node. In some implementations, the nodes 100 can transmit reputation messages 504-1, 504-2 to other nodes. The reputation messages 504 can include reputation data, such as reputation values associated with one or more nodes. In this manner, each node may receive reputation values for a plurality of other nodes. In a specific example, each node can be configured to communicate reputation data with a set of other nodes. In this specific example, each node can directly request reputation data from any node in the set of nodes. Additionally, each node may also request reputation data for a plurality of other nodes from any node in the set of nodes.

The node includes a reputation data store 502 that stores reputation data for a plurality of nodes (e.g., a subset of nodes on the trust network). The reputation data may be stored in a reputation ledger 506 that includes a plurality of node IDs along with associated reputation values. The reputation data store 502 may also store additional information 508, such as data used for generating reputation values and data associated with generating the consensus trust scores.

The reputation determination module 500 can determine a plurality of different reputation values for each node. In some implementations, the reputation determination module 500 may determine one or more work reputation values for the amount of work a node performs with respect to calculating trust scores. For example, the reputation determination module 500 may determine one or more reputation values based on the number of local trust scores calculated, the number of candidate trust scores calculated, and the amount of work related to calculating consensus trust scores. One or more work reputation values may also be based on an amount of communication (e.g., trust consensus messages) performed by the node.

The reputation determination module 500 may also determine a plurality of quality reputation values for nodes based on the quality of the calculations performed by the nodes. For example, the quality reputation values may be based on a number of trust score outliers produced by the nodes and how fast trust scores were produced. The reputation determination module 500 may also determine a plurality of distribution reputation values for nodes based on the distribution of consensus trust scores to requestors and the distribution of trust scores as fraud alerts.

The reputation determination module 500 may also determine a plurality of node performance reputation values based on a variety of node parameters, such as node bandwidth, node processing power, node throughput, and node availability. Example reputation values associated with node availability may be based on uptime values, mean time between failure (MTBF) values, and/or mean time to repair (MTTR) values.

The reputation determination module 500 may determine one or more data storage reputation values based on the amount of data (e.g., historic data) stored at a node and the amount of time for which the data is stored. The reputation determination module 500 may also determine one or more reputation values that indicate an amount of time the node has been included (e.g., online) in the trust network 100. The reputation determination module 500 may determine one or more staking reputation values based on the amount staked by a node. Additionally, the reputation determination module 500 may determine one or more outlier reputation values that indicate a number of outliers associated with a node and whether the outliers were considered fraudulent or supported by evidence.

In some implementations, the reputation determination module 500 may calculate one or more composite reputation values, each of which may be a function of any individual reputation values described herein. For example, a composite reputation value may be a weighted calculation of one or more component reputation values.

The reputation data store 502 may store information in addition to the reputation ledger. For example, the reputation data store 502 may store historic trust score data or other data used to determine the reputation values. In one example, the reputation data store 502 may store a history of each of the trust scores and contribution to the trust scores from each node. In a more specific example, the historical data may include the number of nodes that participated in the consensus calculation, the range of scores used in the calculation, along with other factors upon which the consensus scores were based.

In some implementations, the consensus determination module 310 can determine candidate trust scores and/or consensus trust scores based on one or more reputation values. For example, the consensus determination module 310 may determine whether a trust score is an outlier based on the reputation associated with the node. In some implementations, the consensus determination module 310 may consider reputation values during validation operations.

Referring to FIG. 6, in some implementations, the trust network 100 may implement a token economy that operates as a medium of exchange in the trust network 100. For example, the trust network nodes may include utility token modules 600 that implement a utility token protocol 602. The utility token protocol 602 may be powered by a token (e.g., a native utility token). The utility token may be assigned a name (e.g., a coined name). For example, the utility token may be referred to herein as "UTOKEN," although other names may be used.

The trust network 100 includes a utility token blockchain ledger 606 that may be stored in utility token data stores 604 across the nodes. The utility token ledger 606 may be a version of a public transactional ledger integrated into the trust network 100. The utility token ledger 606 may include a list of UTOKEN transactions between different utility token blockchain addresses. For example, the utility token ledger 606 may indicate the various transactions associated with the nodes 100, such as the purchase of UTOKEN, purchase of trust scores, payment into the reward protocol, rewards paid by the reward protocol, and amount of funds staked by the nodes. The utility token ledger 606 may also include additional data, such as transaction metadata.

UTOKEN can be used in a variety of ways on the trust network 100. In some implementations, UTOKEN can be used as payment for access to trust scores and fraud alerts. In some implementations, UTOKEN can be used to reward nodes for performing work. In some implementations, a node may stake UTOKEN in order to enable additional functionality within the trust network 100. Although UTOKEN is described herein as a medium of exchange in the trust network 100, other payment types may be used as a medium of exchange in the trust network 100. For example, other types of payments/tokens may be used for acquiring trust scores, acquiring fraud reports, paying rewards, and staking. In some implementations, the utility token modules 600 may implement smart contracts for the trust network 100. Communication between the nodes during implementation of the utility token protocol is illustrated at 601.

Initially, the trust network 100 may include a set number of UTOKEN. For example, there may initially be 1,000,000,000 UTOKEN. UTOKEN may be initially granted and/or sold to nodes. In some implementations, the supply of UTOKEN may expand in a deflationary manner, which may track economic indicators including the total number of nodes, transaction volume, staking amount, and fractionalization of the UTOKEN token.

Each node may include a wallet module 614 that can be used to perform transactions on the utility token blockchain 606. The wallet module 614 may implement a variety of functionalities. In some implementations, the wallet module 614 may be used to purchase trust scores. Payments for trust scores may be put into the reward protocol, as described herein. In some implementations, the wallet module 614 may be used to send/receive UTOKENS (e.g., with other nodes). In some implementations, the wallet module 614 can be used to stake UTOKEN. In some implementations, the wallet module 614 can lock UTOKEN, thereby indicating to the trust network 100 that the locked UTOKEN are not available to be sent until unlocked. In some implementations, the wallet module 614 can be used to burn UTOKEN. Burning UTOKEN may prevent the burnt UTOKEN from being used for any function in the future.

The trust network 100 may implement a reward protocol that receives payments for a variety of activities, such as purchasing a trust score and purchasing fraud alerts. The trust network 100 may pay out UTOKEN to nodes (e.g., node wallets) based on a variety of factors. The nodes include reward modules 608 and reward data stores 610 that implement the reward protocol. For example, the reward modules 608 can receive UTOKEN payments and pay out UTOKEN as a reward payment to nodes (e.g., according to work performed). The reward data store 610 may store a reward ledger 616 that indicates the nodes that received reward payments along with the corresponding factors (e.g., work performed) associated with the reward payments. For example, the reward ledger 616 may provide an accounting of the amount of UTOKEN received by the reward protocol, the calculation of the rewards, and the amount of UTOKEN paid out to different nodes in response to the calculations. UTOKEN payments associated with the reward protocol may be stored according to one or more reward addresses on the utility token ledger 606.

The reward protocol can receive UTOKEN from a variety of sources. For example, the reward protocol can receive UTOKEN that was used to purchase trust score reports. As another example, the reward protocol can receive UTOKEN used to purchase fraud alerts.

The reward protocol can make reward payouts to nodes based on a variety of factors associated with the nodes. In some implementations, the reward protocol may pay rewards to nodes based on reputation values associated with the nodes. The reward protocol can examine one or more reputation ledgers 506 to determine the reputation values associated with the nodes. The reward payout calculations may be a multifactor calculation that includes one or more reputation values. The reward calculations and payments may be performed periodically in some cases.

In some implementations, the reward protocol may pay rewards based on one or more work reputation values that indicate an amount of work a node performed with respect to calculating/communicating trust scores. The reward protocol may pay a larger portion of rewards for nodes that perform more work with respect to calculating and communicating trust scores. In some implementations, the reward protocol may pay rewards based on one or more quality/distribution reputation values for nodes based on the quality of the calculations performed by the nodes. The reward protocol may pay a smaller portion of rewards for nodes that produce outlier trust scores.

In some implementations, the reward protocol may pay rewards based on one or more distribution reputation values for nodes based on the distribution of consensus trust scores to requestors and the distribution of trust scores as fraud alerts. The reward protocol may pay a larger portion of rewards for nodes that distribute a greater amount of trust scores. In some implementations, the reward protocol may pay rewards based on one or more performance reputation values. For example, the reward protocol may pay larger rewards to nodes with greater bandwidth, processing power, throughput, and availability.

In some implementations, the reward protocol may pay rewards based on one or more data storage reputation values. For example, the reward protocol may pay larger rewards to nodes that store more data. In some implementations, the reward protocol may pay rewards based on one or more reputation values that indicate an amount of time the node has been included (e.g., online) in the trust network 100. For example, the reward protocol may pay larger rewards to nodes that have been online for a longer period of time in the trust network 100. In some implementations, the reward protocol may pay rewards based on one or more staking reputation values. For example, the reward protocol may pay larger rewards to nodes that have staked more UTOKEN.

In some implementations, algorithm suppliers may be rewarded in UTOKEN for providing nodes that contribute algorithms to the ecosystem. In some implementations, proof of work security providers that may validate the UTOKEN ledger using a proof-of-work consensus algorithm may receive UTOKEN as a block reward to incentivize their participation in the ecosystem. Communication between the nodes during implementation of the reward protocol is illustrated at 603.

FIG. 7 illustrates an example method that describes operation of the reward protocol. In block 700, the reward protocol receives payments for trust scores and fraud alerts. In block 702, the reward protocol retrieves reputation values for a plurality of nodes. In block 704, the reward protocol determines reward payouts to the plurality of nodes based on the reputation values associated with the nodes. In block 706, the reward protocol pays the nodes according to the determined payouts. In block 708, the reward protocol updates the reward ledgers 616 to reflect the payment calculations (e.g., based on reputation values) and the payment amounts. The reward protocol may periodically repeat the method of FIG. 7 so that the nodes may be periodically rewarded for their relative contributions to the trust network 100.

The trust network 100 may implement a staking protocol (e.g., using staking modules 612) in which each node can stake an amount of UTOKEN. The amount of UTOKEN staked may determine the level of functionality afforded to the node. The staked UTOKEN can be reflected in the utility token ledger 606.

Staked UTOKENs may be under the temporary control of the trust network 100. For example, in some implementations, the reward protocol may penalize a node by removing staked UTOKEN. In some implementations, the staking functionality may be implemented as a smart contract in which violation of the contract results in the surrender (e.g., burning) of some staked UTOKEN. In these implementations, fulfillment of the smart contract results in the UTOKEN being returned to the staking party. In some implementations, the reward protocol may penalize a node for producing outlier trust scores if the outlier scores are determined to be fraudulent.

In some implementations, a node can be formed when a network participant stakes a quantity of UTOKEN (e.g., a required quantity). The amount of UTOKEN staked by a node may determine the amount of functionality that may be implemented by the node. For example, staking more UTOKEN may allow a node to implement a greater amount of network functions. In these cases, nodes may be assigned different levels of functionality. A lower level node may have functionality that is limited to requesting trust scores. Higher level nodes may participate in calculating local trust scores, candidate trust scores, and consensus trust scores. There may be any number of node levels that may perform any number of services on the trust network 100. If the trust network penalizes a node and burns the node's stake, the node may descend in level and lose the corresponding functionality. Communication between the nodes during implementation of the staking protocol is illustrated at 605.

In some implementations, the cost a node is required to pay for a trust score may decrease as the amount of UTOKEN staked by the node increases. In these cases, the more a node stakes, the fewer UTOKEN is required for acquiring a trust score (e.g., via real-time reporting). An example relationship of staked UTOKEN and consensus trust score cost is described in the table of FIG. 10A. In one specific example, to be eligible for the discount, the staked amount of UTOKEN may be required to be staked for a period of time (e.g., at least 90 days).

Figure 8B:
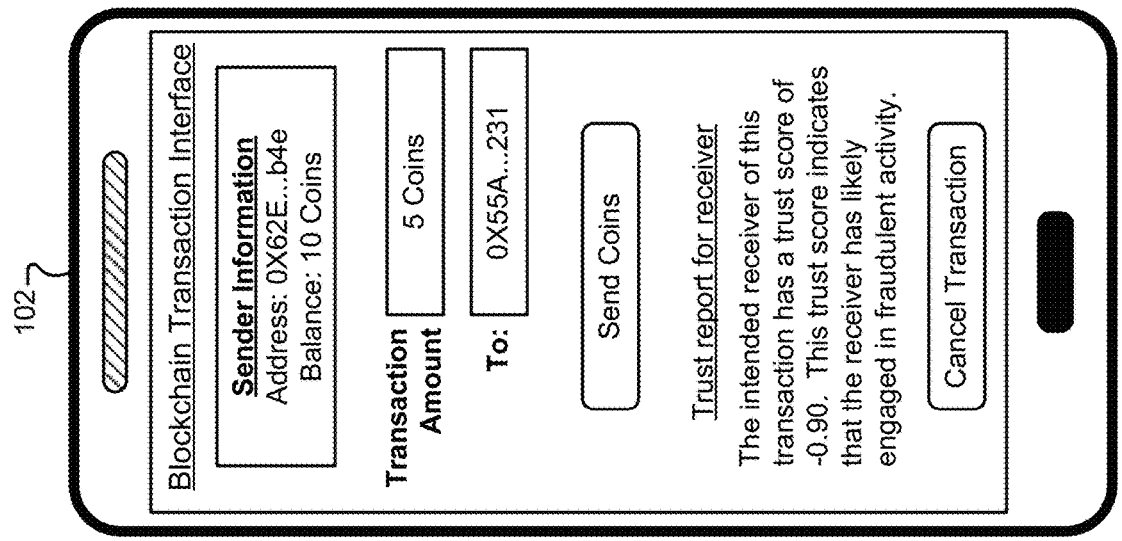
FIGS. 8A-8B illustrate graphical user interfaces (GUIs) for requesting and reviewing trust reports.
Figure 8A:
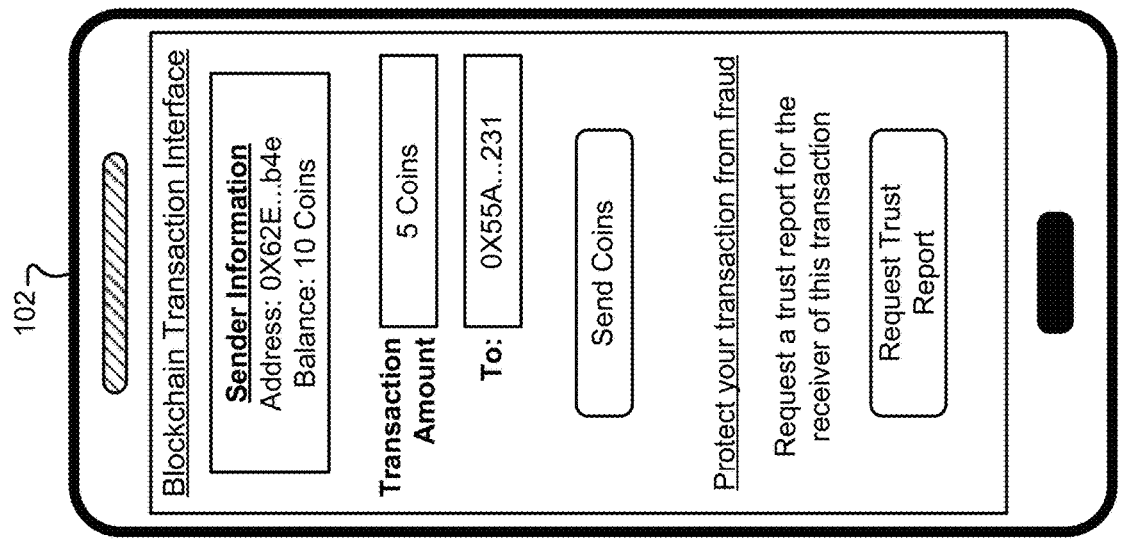

FIGS. 8A-8B illustrate example GUIs that may be generated on a user transactor device 102 by the transaction application 116 or the intermediate transaction system 104. The illustrated GUIs may be for a sender in a cryptocurrency transaction. It can be assumed that the cryptocurrency network on which the blockchain transactions occur in FIGS. 8A-8B use units of "coins" for transactions. The top portion of the GUIs includes fields that indicate the sender's information, such as the sender's blockchain address and their balance (e.g., 10 coins). The top portion of the GUIs also include fields in which the sender can specify a receiver address and indicate the transaction amount (e.g., 5 coins) for the potential transaction. The GUIs include a "Send Coins" GUI element that can initiate the specified transaction between the sender and the receiver.

The lower portion of the GUIs in FIGS. 8A-8B provide the sender with the option of acquiring a trust report from the trust network 100 before engaging in the transaction. For example, in FIG. 8A, the user can select (e.g., touch/click)

the "Request Trust Report" GUI element to send a trust request to the trust network 100. The trust request may include the receiver's address, as specified in the "To:" box above. FIG. 8B illustrates an example trust report received in response to the trust request.

In FIG. 8B, the received trust report indicates that the receiver had a trust score of −0.90. It can be assumed in this case that a negative valued trust score near −1.0 indicates that the receiver address is likely fraudulent. Similarly, a positive valued trust score near 1.0 may indicate that the receiver address is not likely fraudulent. In addition to the numeric score of −0.90, the trust report also summarizes the meaning of the trust score number. Specifically, the trust report indicates that the "trust score indicates that the receiver has likely engaged in fraudulent activity." The GUI also provides a "Cancel Transaction" GUI element that the sender may select (e.g., touch/click) to cancel the specified transaction.

In some implementations, the sender may be charged an amount for requesting the consensus trust score. In implementations where the sender is transacting via an exchange, the exchange may spend UTOKEN into the reward protocol to retrieve the consensus trust score. In implementations where the sender does not interact via an intermediate transaction system 104, the sender may purchase UTOKEN from the trust network 100 for use in acquiring a consensus trust score.

Figure 9:
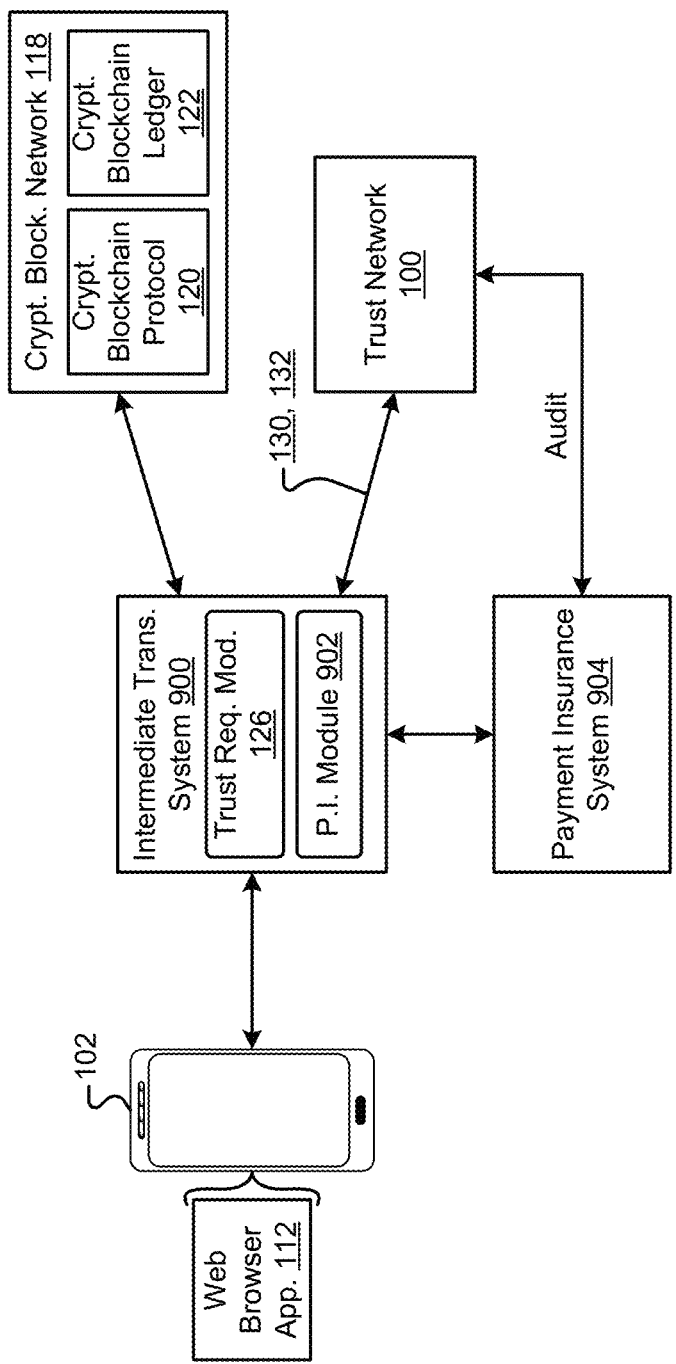
FIG. 9 is a functional block diagram of a trust network being used in a payment insurance implementation.

FIG. 9 illustrates an example in which the trust network 100 is queried as part of a payment insurance process. In FIG. 9, the user transactor device 102 transacts on the cryptocurrency blockchain network 118 via an intermediate transaction system 900. The intermediate transaction system 900 includes a trust request module 126 that can retrieve trust reports from the trust network 100. The intermediate transaction system 900 may also provide payment insurance to the transactor.

The intermediate transaction system 900 of FIG. 9 includes a payment insurance module 902 that may determine whether a transaction will be insured. The terms on which transactions are insurable may be agreed to by the owner/operator of the intermediate transaction system 900 and the owner/operator of the payment insurance system 904 (e.g., an underwriter system). In some implementations, payment insurance may be provided for transactions in which the transacting blockchain addresses have trust scores that indicate a low likelihood of fraud. The payment insurance system 904 can acquire data related to the transactions (e.g., trust scores, timing, etc.) for auditing purposes.

In FIG. 9, initially, the transactor device 102 may initiate a transaction with the intermediate transaction system 900. In response to the initiated transaction, the intermediate transaction system 900 (e.g., the trust request module 126) may retrieve a trust report for the receiver and/or the sender. The intermediate transaction system 900 may then determine whether the transaction is insurable. For example, the payment insurance module 902 may determine whether the transacting blockchain addresses have trust scores that indicate a low likelihood of fraud. In some implementations, the payment insurance module 902 may compare consensus trust scores to trust score threshold values that indicate a maximum tolerable likelihood for fraud. In these implementations, the payment insurance module 902 may indicate that the transaction is insurable if the consensus trust score(s) are less than the trust score threshold value. If the consensus trust score(s) are greater than the tolerable level for fraud, payment insurance may be declined.

In some implementations, the payment insurance module 902 may query the payment insurance system 904 to determine whether the transaction is insurable. The query may indicate the consensus trust scores for the transacting parties. In these implementations, the payment insurance system 904 can make the determination of whether to insure the transaction. The payment insurance system 904 may then notify the intermediate transaction system 900 of whether the transaction is insurable.

In addition to the trust network 100 playing a part in payment insurance processes, the trust network 100 may also play a role in other financial processes. For example, the trust scores/reports generated by the trust network 100 may be used in order to freeze transactions and/or clawback funds.

The trust network 100 may include any number of nodes. As described herein, the nodes 100 may have different levels of functionality (e.g., based on stake). The levels of nodes may be variable and different levels of nodes may be eligible to participate in different services. FIG. 10B illustrates example services associated with three different levels of nodes.

In some implementations, level 1 nodes may stake a minimum quantity of UTOKEN, X, for a period of time (e.g., at least 90 days). Level 1 nodes may perform all node activities in some implementations. In addition to performing updates to trust scores and participating in real-time reporting, a level 1 node may participate in trust score processing and the trust quorum, gathering and validating evidence of fraud and custody, and sending transactors fraud alerts. Level 1 nodes may be the most important nodes in some implementations. In some cases, to maintain the security of the trust network, there should be a minimum number of level 1 nodes (e.g., 100 level 1 nodes). A decentralized autonomous organization (DAO) may include a mandate to run additional level 1 nodes in the event that the minimum is not met.

In some implementations, level 2 nodes may stake the minimum quantity of UTOKEN (e.g., proportional to X/2) for a period of time (e.g., at least 90 days) to perform trust score updates and participate in the trust quorum. Level 2 nodes may additionally update the UTOKEN ledger, add evidence of custody to the blockchain, and deliver fraud alerts. Level 3 nodes may stake the minimum quantity of UTOKEN (e.g., proportional to X/5) for a period of time (e.g., at least 90 days) to validate fraud and custody evidence.

Trust report requests can be stored in a node's transaction mempool for processing and prioritization. Each node level may have a separate transaction mempool. Level 3 nodes, for example, may not store report requests in some implementations. Level 1, however, may store report requests (e.g., state channel updates). In some implementations, nodes that participate in fraud and custody verification can use separate mempools for those purposes.

Nodes may earn rewards for performing services. For example, nodes may earn rewards proportional to their level. When a cryptocurrency transactor accesses a trust score, the UTOKEN may be split between the awarded nodes. Additionally, when a block is secured in the utility token blockchain, nodes may earn a percentage (e.g., 45%) of the mining reward.

A node level can have a respective reward queue. The amount of the mining reward (e.g., 45% of the mining reward) each node receives can be proportional to the amount they staked (e.g., their node level). When a node joins the trust network 100, it may be placed at the bottom of the queue. It may go up the queue so long as it actively provides service on the trust network 100 (e.g., proof of service). When it reaches the top of the queue (e.g., top 10%), it may be eligible for reward selection. In a specific example, the probability of random selection may be 1/n, where n is the number of nodes in the top 10% of the queue.

In a specific implementation, the target par value for the cost of node services may be 1 UTOKEN, while the par value of node earnings may be 1.2 UTOKEN. In this specific implementation, the consensus trust score prices are set above cost to help ensure rewards for nodes.

A node contribution program can enable nodes to co-develop algorithms for the consensus trust score. This program may be a path to contribution that allows nodes to better the accuracy of the algorithm (e.g., predictive algorithm) that assigns trust scores. The program may allow the network to evolve to best fit new use cases and exploits on the blockchain. Rewards to contributors may be controlled by the DAO through a bounty program.

The utility token protocol may be governed by a DAO. The DAO may allow the protocol to keep pace with new developments. Participants may use UTOKEN to vote in the DAO. The DAO may be funded with an endowment of the initial token supply (e.g., 5%) and receive a percentage of mining rewards (e.g., 10% of every mining reward). If the number of level 1 nodes falls below a set number (e.g., 100), the DAO may run the minimum required nodes using DAO funds.

The DAO may determine protocol updates including adjusting supply coefficients, setting bounties to update the protocol, improving or adjusting existing integrations with partners, and accepting work when it is done. The DAO may assign and reward the bounty program. If malicious actors attempt to exploit the trust network 100, a bug bounty for algorithms may be opened to address that particular pattern, thereby strengthening the whole ecosystem. The DAO may additionally approve changes to open source bot software.

The DAO may control key system variables, including the number of UTOKEN staked per node level, staking period, and cryptocurrency transactor discounts per staking amount.

Correctly proportioned node staking may enable a healthy token economy. The DAO may adapt the protocol to ensure there is enough UTOKEN in circulation to facilitate transactions and sufficient staking to promote a healthy and balanced token velocity. FIG. 10D illustrates sample UTOKEN staking amounts and number of level 1 nodes. For example, the chart may describe example node numbers for when there is between 35 percent and 50 percent of UTOKEN in circulation.

Nodes may separate the work of updating trust scores into cliques based on the organic underlying graph topology of the blockchain. Cliques can then be assigned to nodes to update and report on. The separation of the graph into cliques may prevent individual nodes from having full access to all of the trust data. This may protect the integrity of the token economy while still maintaining a full graph. There may be an overlap of addresses within cliques. As the number of nodes increases, clique overlap may increase.

The table of FIG. 10C illustrates an example relationship of the number of nodes, the number of cliques, the address overlap, and the probability that a node will get a single address in their control. Here, overlap may scale with the number of nodes. The security of the trust network 100 may scale with the number of nodes on the trust network 100. The maximum probability of a node getting a specific address is 5%, with a minimum of 5 overlapping addresses per clique.

The probability of a node getting a single address may be determined by: P(Address A)=(number of cliques with Address A)/(total number of cliques).

However, the probability of getting control of a specific address may be different than the probability of getting control of any address. If a participant only has one node, that participant cannot get control over a single address, since other nodes contain that address in their cliques as well.

The high cost to become a node may be one way the network prevents Sybil attacks. Because clique placement may be pseudo-random, in some cases, a malicious actor must control 51% of the nodes on average to have 51% control over a single address.

A hypergeometric distribution described below may be used to calculate the probability of a node randomly getting 51% control of a single address or any address.

$$N = \text{Number of nodes}$$

$$B = \text{Bad nodes (who want to control address)}$$

$$O = \text{Overlap}$$

$$C = \text{Number of nodes to control for } 51\% = (O/2) + 1$$

$$P(\text{control over a specific address}) =$$

$$\prod_{k=C}^{O} \frac{(B \text{ choose } k)((N-B) \text{ choose } (O-k))}{(N \text{ choose } O)}$$

The more nodes there are and the higher the cost of UTOKEN, the more difficult it is to mount such an attack. For the base case of 100 nodes with 5 overlap, the probability of getting 51% control of an address may be: P(51% control)=P(3 nodes gain control over address)+P(4 nodes gain control over address)+P(5 nodes gain control over address)=$\Pi_{k=3}^{5}$ (5 choose k) (95 choose 5-K)/(100 choose 5)=6.2e-05.

When the number of cliques increases to 1,000, and overlap increases to 50, the probability becomes 1.7e-10. As the number of nodes and cliques increase, the probability of a 51% attack to control the trust score of any single address approaches 0.

Figure 11:
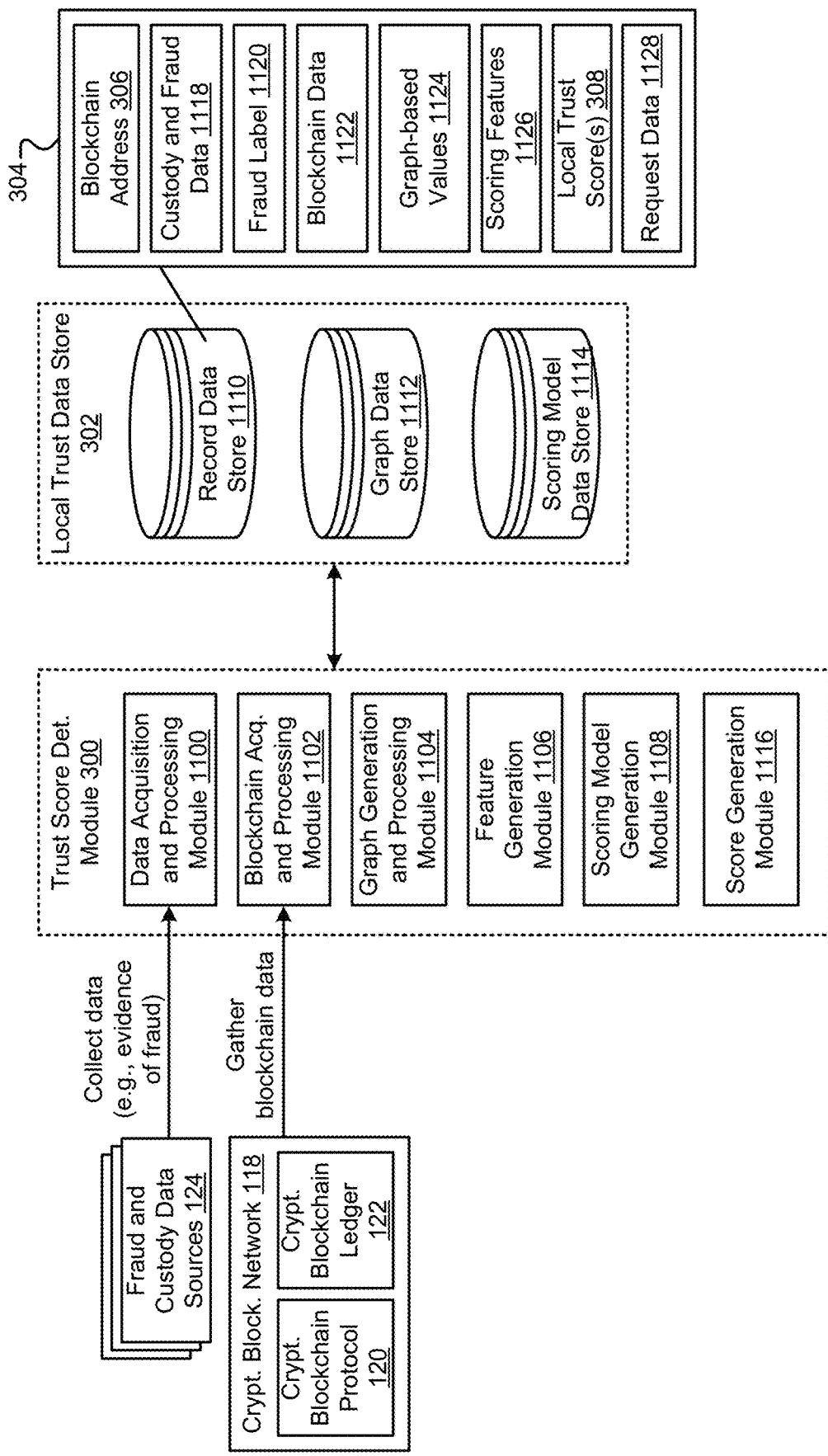
FIG. 11 is a functional block diagram of an example trust score determination module and local trust data store.
Figure 12:
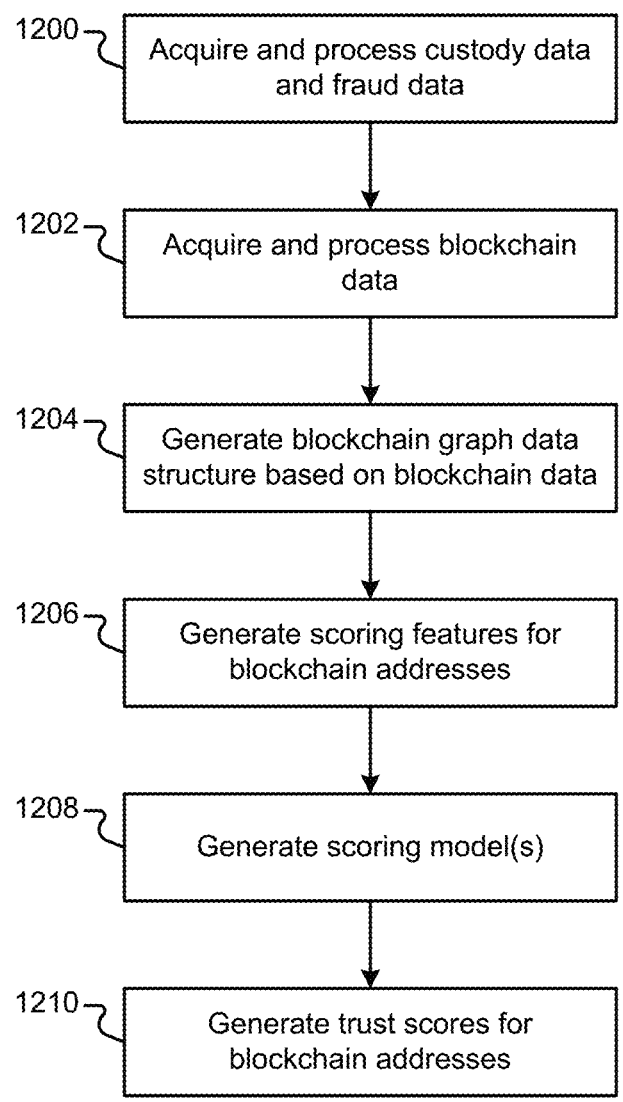
FIG. 12 is a method that describes operation of an example trust score determination module.

FIG. 11 is an example detailed functional block diagram of the trust score determination module 300 (hereinafter "trust module 300") and the local trust data store 302. FIG. 12 is a method that describes operation of the trust module 300. Referring to FIG. 11, the trust module 300 acquires and processes a variety of data described herein. The processed data can be included in the local trust data store 302. The data associated with a single cryptocurrency blockchain address is illustrated herein as a blockchain address record 304. A record data store 1110 may include a plurality of such blockchain address records 304, each for a different blockchain address. Each blockchain address record 304 can include a blockchain address 306 that uniquely identifies the record. The blockchain address record 304 described herein represents data stored in the local trust data store 302. The local trust data store 302 may include a variety of different data structures that are used to implement the data. Accordingly, the blockchain address record 304 may be implemented using one or more different data structures than explicitly illustrated herein.

FIG. 12 is a method that describes operation of the trust module 300 illustrated in FIG. 11. In block 1200, the data acquisition and processing module 1100 acquires and processes a variety of types of data 124, such as custody data and fraud data (e.g., see FIG. 13). The data acquisition and processing module 1100 may store custody and fraud data 1118 related to a blockchain address in the blockchain address record 304. The data acquisition and processing module 1100 may also generate a fraud label 1120 that indicates whether the blockchain address is likely fraudulent based on the acquired fraud data.

Figure 14:
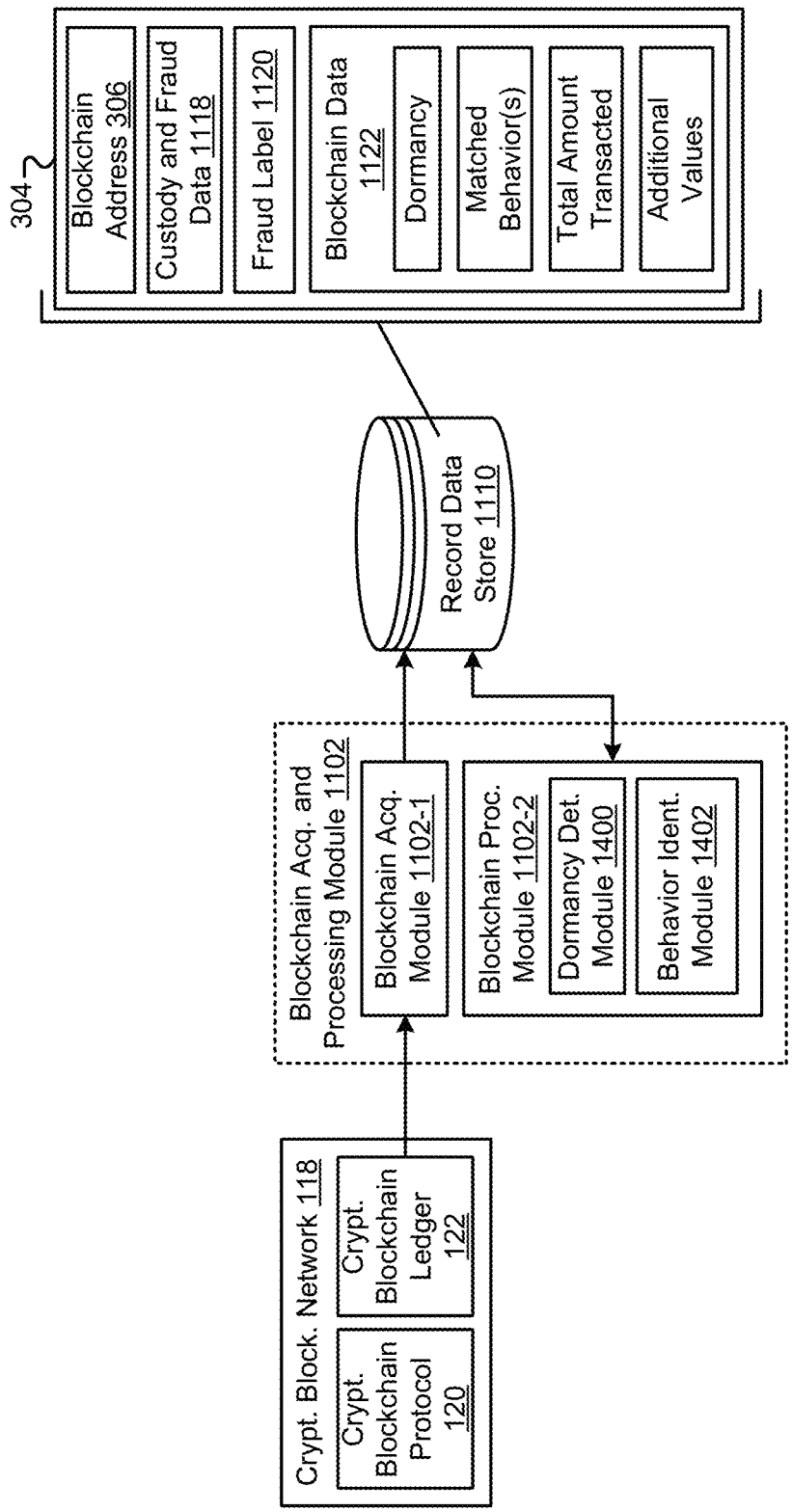
FIG. 14 is a functional block diagram of a blockchain data acquisition and processing module.

In block 1202, the blockchain acquisition and processing module 1102 acquires and processes blockchain data (e.g., the blockchain ledger 122) (e.g., see FIG. 14). The blockchain acquisition and processing module 1102 may store raw and processed blockchain data 1122 relevant to a blockchain address in the blockchain address record 304. In block 1204, the graph generation and processing module 1104 generates a blockchain graph data structure based on the blockchain data (e.g., see FIGS. 15A-15B). The blockchain graph data structure may be stored in the graph data store 1112. The graph generation and processing module 1104 may also process the graph to determine one or more graph-based values 1124 (e.g., importance values) that may be used to generate local trust scores.

Figure 16:
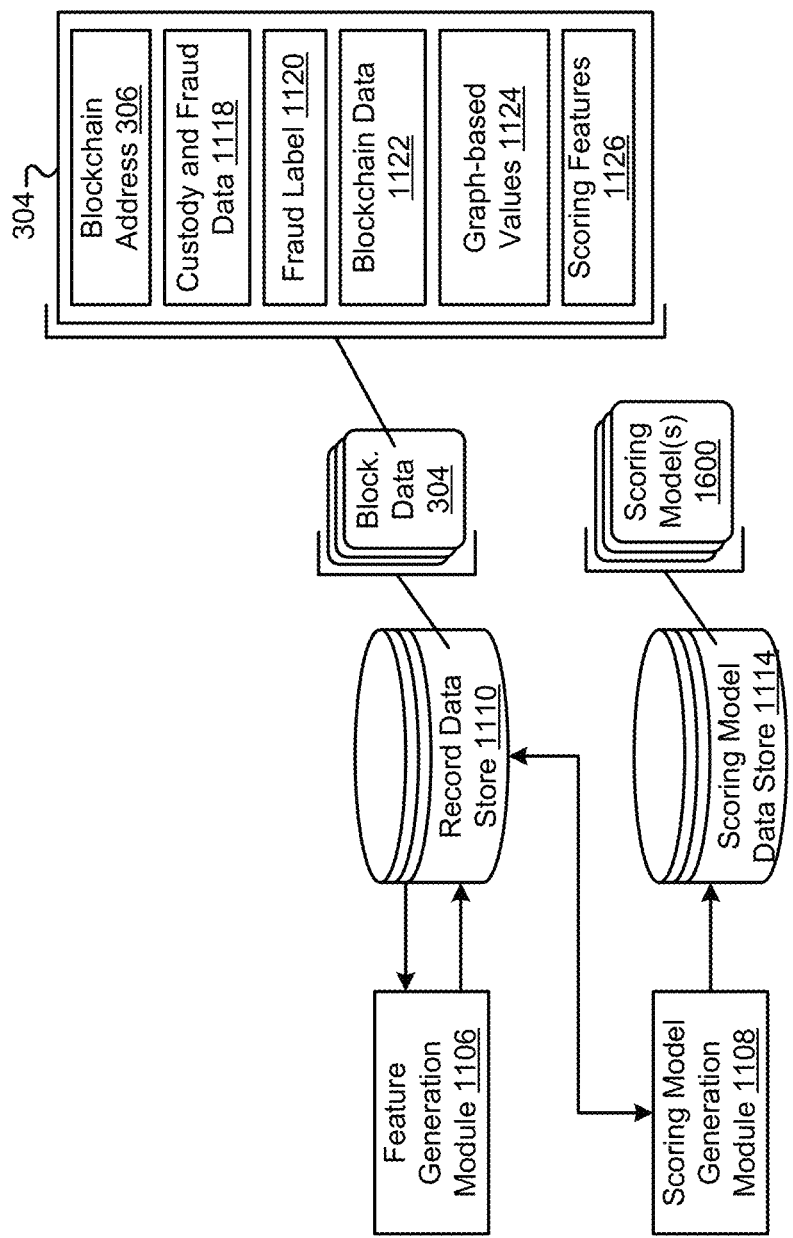
FIG. 16 is a functional block diagram of a scoring feature generation module and a scoring model generation module.

In block 1206, the feature generation module 1106 generates scoring features 1126 for blockchain addresses (e.g., see FIG. 16). In block 1208, the scoring model generation module 1108 generates one or more scoring models based on the scoring features and other data (e.g., labeled fraud data). The one or more scoring models may be stored in the scoring model data store 1114. In block 1210, the score generation module 1116 generates one or more local trust scores 308 for blockchain addresses using one or more scoring models and the scoring features associated with the blockchain addresses (e.g., see FIG. 17). Data related to the requests and responses for consensus trust scores may be stored as request data 1128 of the blockchain address record 304.

Detailed examples of the trust module 300 and the local trust data store 302 are now described with respect to FIGS. 13-15A and FIGS. 16-17. Various modules and data stores have been omitted from the figures for illustration purposes only. For example, the various modules and data stores have been omitted to focus on the functionality associated with the modules and data stores that are illustrated.

Figure 13:
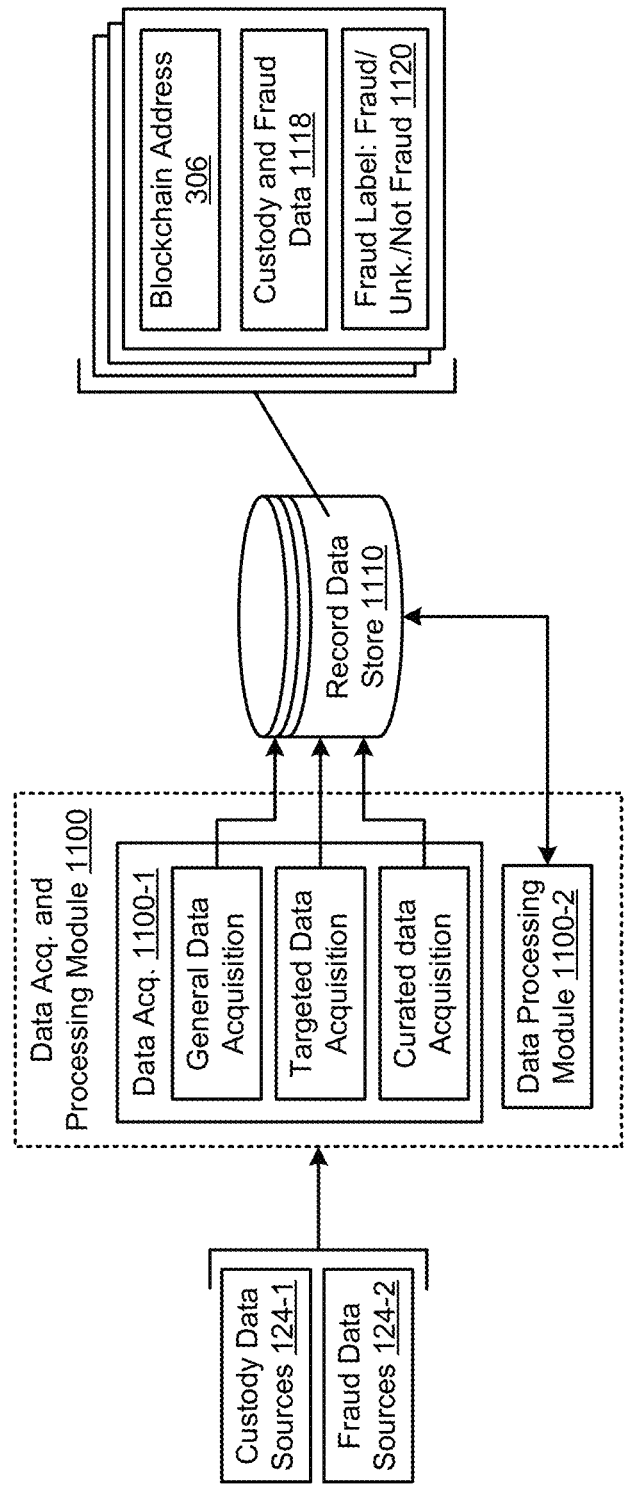
FIG. 13 is a functional block diagram of a data acquisition and processing module.
Figure 15A:
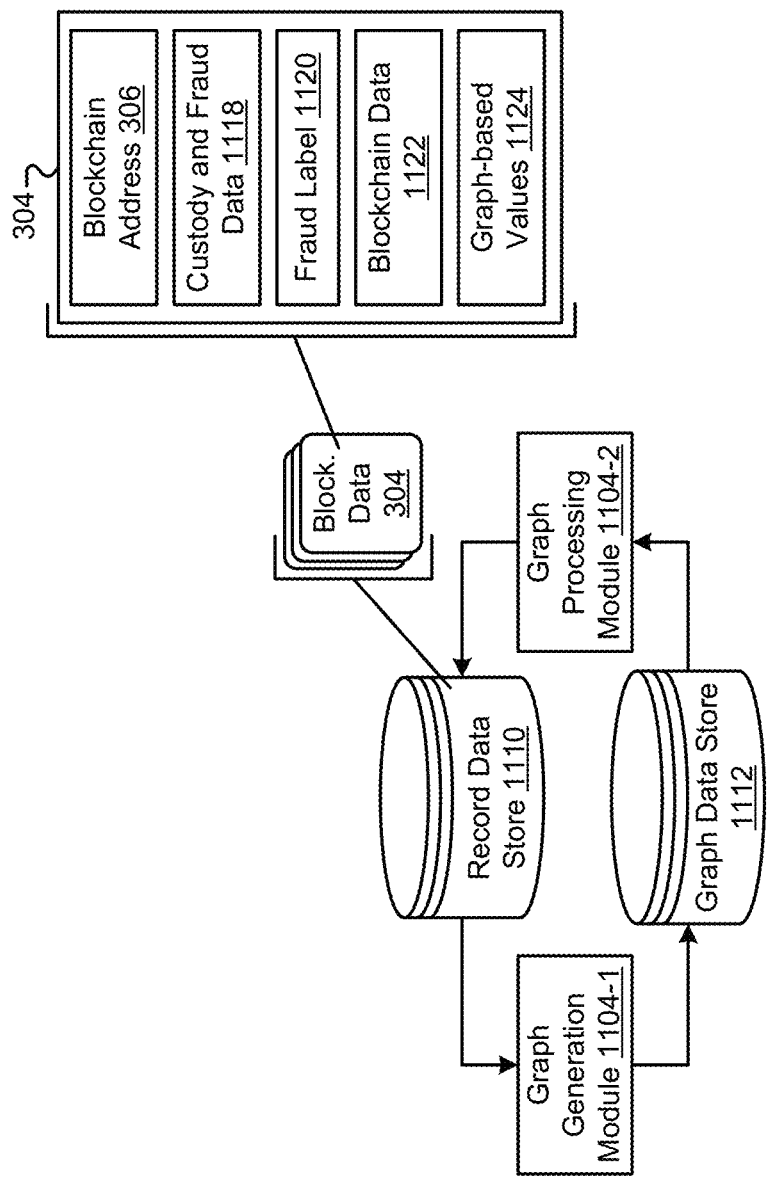
FIGS. 15A-15B illustrate generation and processing of a blockchain graph data structure.
Figure 15B:
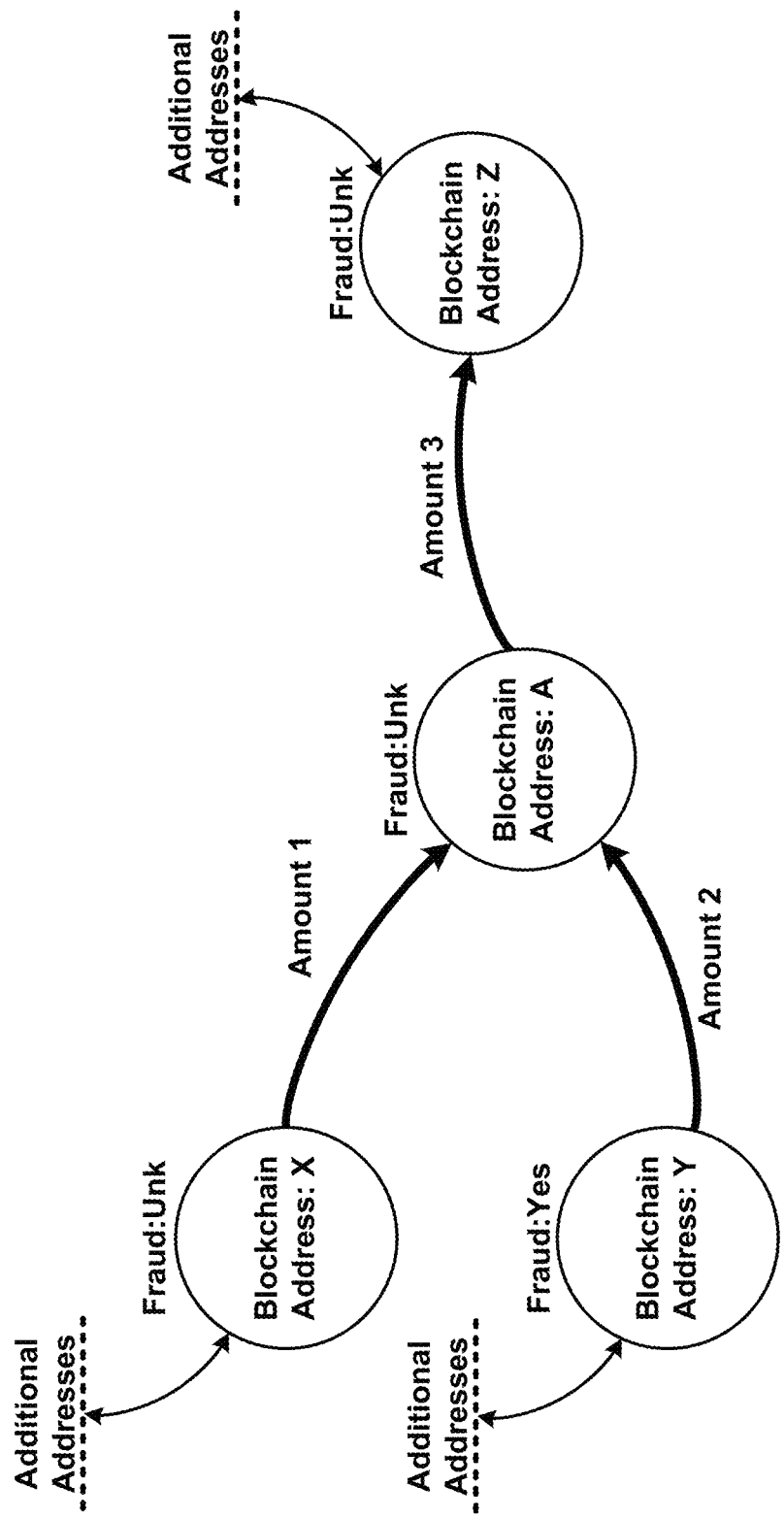
Figure 17:
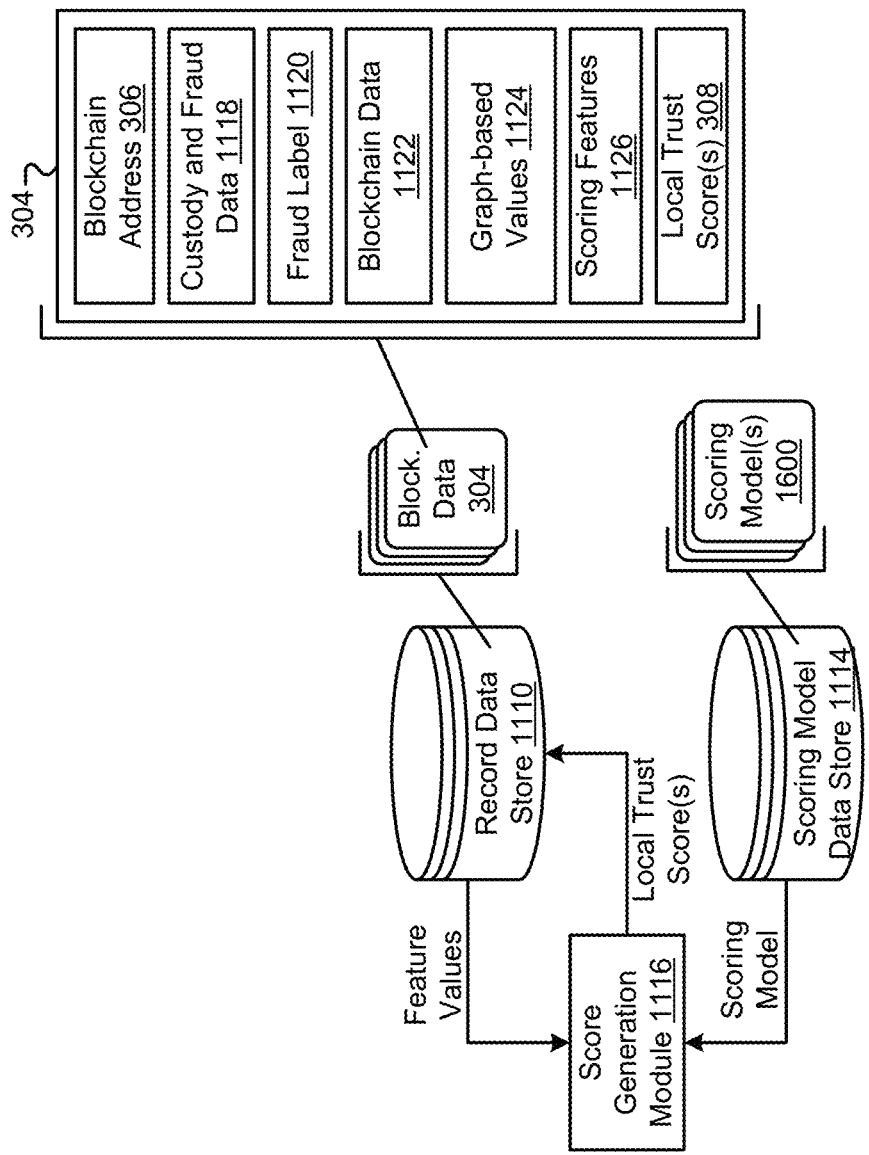
FIG. 17 is a functional block diagram that illustrates operation of a score generation module.

FIG. 13 illustrates data acquisition and processing of fraud and custody data sources. FIG. 14 illustrates acquisition and processing of blockchain data. FIGS. 15A-15B illustrate generation and processing of a blockchain graph data structure. FIG. 16 illustrates scoring feature generation and scoring model generation. FIG. 17 illustrates the generation of local trust scores for a blockchain address using a scoring model and scoring features for the blockchain address.

Referring to FIG. 13, the data acquisition and processing module 1100 includes a data acquisition module 1100-1 that acquires data from the fraud and custody data sources 124. The data acquisition and processing module 1100 also includes a data processing module 1100-2 that processes the acquired data. The raw and processed data 1118 can be stored in the record data store 1110. The data acquisition module 1100-1 can acquire data in a variety of ways. In some implementations, the data acquisition module 1100-1 can acquire curated data, such as curated/purchased data provided by partners/customers. In some cases, data can be user peer-reviewed structured data.

In some implementations, the data acquisition module 1100-1 may be configured to automatically acquire data (e.g., crawl/scrape websites). For example, the data acquisition module 1100-1 may be configured to do targeted data acquisition, such as acquiring data for specific social media accounts. As another example, the data acquisition module 1100-1 may perform more general data acquisition, such as more general crawling/scraping of sites.

The data acquisition module 1100-1 can acquire custody data from custody data sources 124-1. Custody data may indicate the party that owns/controls the blockchain address (e.g., the keys). Example parties that may take custody of blockchain addresses may include, but are not limited to, exchanges, wallets, and banks. In some implementations, the custody sources 124-1 can provide the custody data.

In some implementations, the trust module 300 may implement custodian specific trust score generation. For example, the trust module 300 may select a specific scoring model based on the custodian associated with the blockchain address. In some implementations, the trust module 300 may implement customer/custodian specific reporting for blockchain addresses (e.g., based on the custodian associated with the blockchain address). For example, the trust report may be formatted in a specific manner for a specific custodian.

The data acquisition module 1100-1 acquires data that may provide evidence of fraud from a variety of fraud data sources 124-2. The trust module 300 may make a determination of the likelihood of fraud for blockchain addresses based on fraud data. For example, the trust module 300 may label blockchain addresses as fraud based on the fraud data. Subsequently, the trust module 300 may generate scoring features and scoring models based on the labeled blockchain addresses.

In some implementations, the trust module 300 may be configured to acquire databases and lists that indicate fraudulent activity associated with a blockchain address. In one example, fraud data sources 124-2 can include databases of fraud information, such as third-party databases of fraud information and/or customer provided databases of fraud information. The databases may be provided by public entities (e.g., government watchlists) and/or private entities (e.g., a company generated watchlist).

In some examples, a database of fraud information may be provided in the form of a blacklist that includes a list of blockchain addresses that have been identified as having engaged in fraud. In this example, the data acquisition module 1100 may acquire public blacklists, purchase blacklists, and/or receive blacklists from customers. In some cases, blacklists may have been peer reviewed by a community of trusted parties (e.g., experts). In some implementations, the data processing module 1100-2 can mark addresses as fraudulent if the address is included on a blacklist. In other implementations, the presence of the blockchain address on a blacklist can be used as a scoring feature for determining whether the blacklisted blockchain address is likely fraudulent.

In some implementations, the data acquisition module 1100-1 may be configured to acquire fraud data from targeted locations, such as locations on the internet specified by web uniform resource locators (URLs) and/or usernames (e.g., a specific social media account). In some implementations, locations may be provided (e.g., web URLs) that the data acquisition module 1100-1 may monitor for fraudulent activity. For example, a customer may provide a web address to a social media page associated with a specific blockchain address. In this example, the data processing module 1100-2 may identify fraudulent behavior if a blockchain address other than the specified blockchain address appears in the web contents at the web address. In another example, if there is a known contribution address of an initial coin offering (ICO), accounts and blockchain addresses fraudulently attempting to acquire funds (e.g., phish) may be detected. The trust network 100 may notify a user of the fraudulent address and use the evidence of fraudulent activity as described herein.

Although the data acquisition module 1100-1 may be configured to acquire fraud data from targeted locations, in some implementations, the data acquisition module 1100-1 can generally crawl and scrape other data sources (e.g., social media sites) for fraud data and other data. In these examples, the data processing module 1100-2 may identify fraudulent blockchain addresses based on behavior across a social media platform, such as scams that request funds from multiple social media users, new accounts that directly ask other users for funds, and fake initial coin offering scams.

In some implementations, the trust module 300 (e.g., the data processing module 1100-2) may label a blockchain address as fraudulent (e.g., at 1120). For example, the data processing module 1100-2 may label a blockchain address as fraud based on fraud data. In a specific example, the data processing module 1100-2 may label a blockchain address as fraud if the blockchain address is included in one or more blacklists. If a blockchain address is not labeled as fraud, the fraud status of the blockchain address may be unknown. Put another way, an unlabeled blockchain address does not necessarily indicate that the blockchain address is not fraudulent. In some cases, a blockchain address may be labeled as a known good address that is not fraudulent. For example, an exchange wallet or verified smart contract may be examples of known good addresses.

For blockchain addresses that are assigned one or more trust scores and labeled as fraud, the fraud label for the blockchain address may be dispositive on the issue of fraud for the blockchain address. As such, in these implementations, the trust module 300 may disregard the trust score for the blockchain address and/or set the trust score for the blockchain address to a 100% certainty of fraud. In other implementations, the trust module 300 may continue to calculate trust scores for the blockchain addresses labeled as fraud.

The fraud label 1120 can also include fraud label metadata. The fraud label metadata may indicate the source of the information used to label the blockchain address as fraud (e.g., a specific blacklist). The fraud label metadata may also indicate a type of fraud (e.g., a phishing scam). The fraud label metadata can also include the content of the fraudulent behavior, such as text associated with a scam (e.g., text posted online or in an email). The trust module 300 can return the fraud label metadata to a requesting device to clearly explain the reason the trust module 300 has labeled a blockchain address as fraudulent.

Referring to FIG. 14, the blockchain data acquisition module 1102-1 (hereinafter "blockchain acquisition module 1102-1") can acquire blockchain data from the blockchain network 118. For example, the blockchain acquisition module 1102-1 can acquire the blockchain transaction ledger 122. The blockchain acquisition module 1102-1 can store the raw blockchain data 1122 in the record data store 1110. The blockchain processing module 1102-2 can process the blockchain transaction ledger 122 and store the processed blockchain values 1122 (e.g., transaction amounts, dormancy, etc.) in the record data store 1110 (e.g., in a blockchain address record 304).

The blockchain transaction ledger 122 includes data for a plurality of blockchain transactions. Each transaction may include: 1) a sender address, 2) a receiver address, and 3) a value amount (e.g., a coin amount). A transaction may also include transaction identification data that uniquely identifies the transaction on the blockchain. The transaction identification data may be referred to herein as a transaction identifier (ID). In some implementations, a transaction hash can be used as a unique identifier for a transaction. A transaction hash may be a string of pseudorandom characters that uniquely identify a transaction. Some blockchains may also include additional data that may be stored and processed. Example additional data may include internal transaction data, such as a program that is executed in an Ethereum smart contract.

The blockchain transaction ledger can include a plurality of blocks. Each of the blocks can include a collection of transactions. A block may include a collection of transactions that occurred on the blockchain within a certain period of time. A block may include a block number (e.g., a sequentially assigned number) that may act as an identifier for the block. In the case of Bitcoin, a transaction may include the sending party's address, the receiving party's address, the amount sent, and various parameters describing speed. Ethereum may include similar transaction data, as well as raw data around what function on a smart contract was executed, if a function was executed.

Different blockchain networks may include different types of blockchain ledgers. For example, different blockchain ledgers may include blockchain transaction data in different formats. As another example, different blockchain ledgers may include additional or alternative data associated with transactions. The blockchain acquisition module 1102-1 can be configured to acquire blockchain transaction data for different blockchains. For example, the blockchain acquisition module 1102-1 can include different modules, each of which may be configured for acquiring blockchain transaction data for a different blockchain network.

In some cases, a blockchain network can include timing data that indicates the time of blockchain transactions (e.g., relative/absolute time). In these implementations, the blockchain acquisition module 1102-1 can use the provided timing data to indicate when the transaction occurred. In other cases, a blockchain network may not include timing data. In these implementations, the blockchain acquisition module 1102-1 can generate a time stamp for the transaction. In some cases, timing data can be generated from the block assigned to the transaction. Blocks may be assigned as part of the mining process whereby actors on the blockchain compete to verify the validity of a set of transactions. Once a block is mined, and the transactions are verified, then the timing data can be assumed from other miners' consensus.

The blockchain processing module 1102-2 can determine a variety of values based on the acquired blockchain data. The trust module 300 (e.g., the score generation module 1116) can use the determined values as scoring features for determining trust scores. The trust module 300 (e.g., the model generation module 1108) can also generate scoring models based on the determined values. The blockchain values for a blockchain address can be stored in the blockchain address record (e.g., at 1122).

The blockchain processing module 1102-2 can include functionality for determining the different blockchain values described herein. For example, the blockchain processing module 1102-2 of FIG. 14 includes a dormancy determination module 1400 that can determine dormancy values for a blockchain address. The blockchain processing module 1102-2 also includes a behavior identification module 1402 that can determine whether the blockchain address matches one or more behavioral templates (e.g., patterns or fingerprints). The modules 1400, 1402 included in the blockchain processing module 1102-2 of FIG. 14 are only example modules. As such, the blockchain processing module 1102-2 may include additional/alternative modules than those modules illustrated in FIG. 14. Additionally, the blockchain values included in the blockchain data 1122 of FIG. 14 are only example values. As such, the blockchain data for a blockchain address may include additional/alternative values.

In some implementations, the blockchain processing module 1102-2 may determine values associated with the amount of funds transacted by a blockchain address. For example, the blockchain processing module 1102-2 may determine: 1) a total amount of funds received by the blockchain address, 2) a total amount of funds sent by the blockchain address, 3) the total amount of funds transacted in and out of the blockchain address, and 4) the average transaction amount for the blockchain address.

In some implementations, the blockchain processing module 1102-2 may determine values associated with the timing of transactions associated with a blockchain address. For example, the blockchain processing module 1102-2 can determine an activity level of the blockchain address, such as how often the address is involved in a transaction (e.g., average times between transactions and variance). As another example, the blockchain processing module 1102-2 can determine the age of transactions associated with the address. Another example scoring feature related to timing may include the time between entrance of funds and exit of funds from a blockchain address (e.g., timing for a single transaction or average over multiple transactions). In some cases, fraudulent activity may not immediately exit an address.

As another example, the dormancy determination module 1400 can determine the probability of dormancy for the blockchain address. An example dormancy probability may indicate an amount of time for which the blockchain address is not associated with transactions. For example, a dormancy probability may indicate an amount of time for which the blockchain address is not associated with transactions relative to the address' expected time between transactions. Put another way, the example dormancy time may indicate the probability that the blockchain address is dormant. With respect to dormancy likelihood, fraudulent addresses may not stay active for long in some cases.

In some implementations, the blockchain processing module 1102-2 may determine values associated with the timing of transactions and the amount of the transactions. For example, the blockchain processing module 1102-2 may determine: 1) a total amount of funds received over a period of time, 2) a total amount of funds transferred over a period of time, and 3) a total amount of funds transacted over a period of time.

In some implementations, the blockchain processing module 1102-2 may determine values associated with how the blockchain address interacts with other blockchain addresses. For example, the blockchain processing module 1102-2 may determine the list of addresses that have interacted with the blockchain address and/or the total number of addresses that have interacted with the blockchain address (e.g., as senders and/or receivers). This value may be iteratively computed to determine how important an address is to its local neighborhood and the blockchain as a whole.

The blockchain processing module 1102-2 includes a behavior identification module 1402 that can determine whether a blockchain address matches specific behavior templates that may be indicative of fraud. If the behavior identification module 1402 identifies a match between a blockchain address' behavior and a behavior template, the match may be stored in the blockchain address record 304. In some implementations, the local trust data store 302 may store a set of behavior templates. In these implementations, the behavior identification module 1402 can determine whether the blockchain address' behavior matches one or more of the set of behavior templates.

A behavior template may include a set of conditions that, if satisfied, cause the behavior template to be matched to the blockchain address. A behavior template may include conditions that are based on any of the blockchain values described herein. For example, a behavior template may include conditions that are based on at least one of 1) amounts of funds transferred, 2) the number of transactions, 3) the timing of transactions (e.g., rate of transactions), 4) how the blockchain address interacts with other addresses (e.g., number of different senders/receivers and patterns of transactions), and 5) the likelihood of dormancy of the address.

In one specific example, a behavior template may define a threshold number of transactions (e.g., 5 transactions in and out) at a threshold rate. In this example, the behavior template may be matched if a blockchain address engages in a low number of transactions (e.g., less than or equal to the threshold number) in quick succession (e.g., a short rapid burst). Another example condition for the behavior template may be a high dormancy probability, as any transactions may be limited to bursts. In another specific example, a behavior template may define a high threshold number of transactions (e.g., irregularly high for the blockchain). In this example, a behavior template may be matched if the blockchain address engages in greater than the threshold number of transactions. In this example, the behavior template may also require a high importance value, such that the blockchain address is required to have a minimum importance value to match the template. Furthermore, the behavior template may require a low likelihood of dormancy, as the fraudulent behavior may follow a pattern of regular transactions.

If the blockchain address matches a behavior template, the match may be stored as a blockchain value in the blockchain address record 304. For example, the blockchain address record may store a binary value (e.g., 0/1) for each behavior template that indicates whether the behavior template was matched. In implementations where the behavior identification module 1402 determines a value (e.g., a decimal or integer value) that indicates how well the blockchain address matches the behavior template, the value may be stored in the blockchain address record 304.

Referring to FIGS. 15A-15B, the graph generation module 1104-1 generates a blockchain graph data structure based on the blockchain transactions for a plurality of different blockchain addresses. The graph data structure includes blockchain addresses and transactions between the blockchain addresses. For example, for each blockchain address, the graph data structure may describe each transaction associated with the blockchain address along with the direction of the transaction, such as whether the blockchain address was a sender or receiver. The graph data structure can also include the transaction amount for each transaction. In some implementations, the graph data structure can include fraud data (e.g., fraud labels). The fraud label can indicate that the address has been involved in fraudulent activity (e.g., a known fraudulent address).

FIG. 15B illustrates an example representation of the graph data structure. In FIG. 15B, the graph data structure is represented by nodes and edges. The graph data structure includes blockchain addresses as nodes of the graph. The transactions between blockchain addresses are edges between the nodes, where the arrows indicate the direction of the transaction (e.g., the receiver is at the arrowhead). The amount for each transaction is labeled adjacent to the arrow. The fraud label for each blockchain address is included above the node. FIG. 15B includes 4 transactors with blockchain addresses A, X, Y, Z. Blockchain address Y has been labeled as a fraudulent address. The other blockchain addresses have an unknown fraud status. The graph illustrates 3 blockchain transactions. A first transaction is from blockchain address X to blockchain address A for a first amount (i.e., amount 1). A second transaction is from blockchain address Y to blockchain address A for a second amount (i.e., amount 2). A third transaction is from blockchain address A to blockchain address Z for a third amount (i.e., amount 3).

The graph data structure is stored in the graph data store 1112. The graph generation module 1104-1 can update the graph data structure over time so that the graph data structure includes an up to date representation of the transactions included on the blockchain network 118.

The graph processing module 1104-2 can generate graph-based values 1124 using the graph data structure. The graph-based values 1124 may be stored in the blockchain address record 304. The graph processing module 1104-2 can update the graph-based values 1124 over time.

In some implementations, the graph processing module 1104-2 can determine one or more importance values for each of the blockchain addresses. The importance values may indicate the importance of a blockchain address relative to other blockchain addresses (e.g., relative to all blockchain addresses). In some implementations, the graph processing module 1104-2 may determine the importance values for a blockchain address based on adjacent blockchain addresses. In some implementations, the graph processing module 1104-2 may weight the contribution of adjacent blockchain addresses by the importance of the blockchain addresses.

In some implementations, the graph processing module 1104-2 may determine an importance value by counting the number of transactions coming into a blockchain address. In this specific example, more transactions may indicate that the blockchain address is more important than other blockchain addresses with fewer incoming transactions. In some implementations, the graph processing module 1104-2 may determine an importance value by determining the number of different blockchain addresses with which the blockchain interacts. In some implementations, the graph processing module 1104-2 may determine an importance value that indicates the total amount of funds into the blockchain address relative to the amount of funds out of the address (e.g., amount out divided by amount in). In another example, the graph processing module 1104-2 may determine an importance value that indicates the number of transactions into the blockchain address relative to the number of transactions out of the blockchain address (e.g., total number of transactions in divided by total number of transactions out). In another example, the graph processing module 1104-2 may determine an importance value based on the number of transactions in to the blockchain address, the number of transactions out of the blockchain address, the amount of funds in, and the amount of funds out. In some implementations, the graph processing module 1104-2 may implement other processing techniques, such as PageRank (PR) and/or personalized hitting time (PHT).

In some implementations, the graph processing module 1104-2 may determine a fraud distance scoring feature that indicates the blockchain address' distance from fraud in the graph. For example, fraud distance scoring features may include a minimum distance from fraud, an average distance from fraud, and/or the number of fraudulent blockchain addresses with which the blockchain address has interacted.

Referring to FIG. 16, the feature generation module 1106 can generate scoring features for each of the blockchain addresses. The trust module 300 (e.g., score generation module 1116) can generate one or more local trust scores for a blockchain address based on the scoring features associated with the blockchain address. The scoring features can be numerical values (e.g., integer or decimal values), Boolean values (e.g., 0/1), enumerated values, or other values.

The feature generation module 1106 can generate the scoring features based on any of the blockchain values described herein. For example, scoring features for a blockchain address may be based on 1) amounts associated with transactions, 2) timing data associated with transactions (e.g., dormancy), 3) graph-based values (e.g., one or more importance values) associated with the blockchain address, and/or 4) behavior-based data associated with the blockchain address.

With respect to behavior-based data, the feature generation module 1106 may generate a Boolean scoring feature that indicates whether the blockchain address matches any of the behavior templates. In another example, the feature generation module 1106 may generate a Boolean scoring feature for each of the behavior templates, such that the scoring features identify which of the behavior templates are matched. In another example, the feature generation module 1106 may generate a scoring feature that indicates how many of the behavior templates were matched (e.g., a percentage of the total available). In another example, instead of generating Boolean features, the feature generation module 1106 may generate numeric values that indicate how well the blockchain address matched the behavior templates, such as a decimal value (e.g., 0.00-1.00) that indicates how well the behavior template was matched.

The trust module 300 includes a scoring model generation module 1108 (referred to herein as a "model generation module 1108") that can generate scoring models 1600 that are used to generate local trust scores for a blockchain address. For example (e.g., see FIG. 17), a scoring model can receive scoring features for a blockchain address and output a local trust score for the blockchain address. The model generation module 1108 can generate a scoring model based on training data. The training data can include scoring features along with associated fraud labels. The set of scoring features a model uses as input may be referred to herein as a "feature vector." In some implementations, the trust module 300 can use a deep neural net to score, where the classification is determined by known good/bad addresses. The neural net may be trained over the feature vectors. In some implementations, the trust module 300 can leverage models based on random forests, decision trees, and logistic regression, and combine them in the form of a "consensus of experts."

The model generation module 1108 can generate a scoring model (e.g., a machine learned model) based on training data that includes sets of feature vectors and their corresponding fraud label (e.g., Fraud: 0/1). In this example, the generated scoring model may output a local trust score (e.g., a decimal value) that indicates the likelihood the blockchain address is fraudulent. In some implementations, the training data may also include a label that positively indicates that the blockchain address is a known good address (e.g., not fraudulent).

Although the trust module 300 can generate scoring models that are used to generate local trust scores, the trust module 300 may generate local trust scores in other manners. For example, the trust module 300 may generate local trust scores using scoring functions (e.g., weighted scoring functions) and/or heuristic models that generate local trust scores according to rules.

FIG. 17 illustrates an example score generation module 1116 that generates local trust scores for blockchain addresses. The score generation module 1116 may generate a local trust score for a blockchain address by using a feature vector for the blockchain address and a scoring model. For example, the score generation module 1116 may input a feature vector for a blockchain address into a scoring model that outputs a local trust score.

The local trust score 308 for a blockchain address can be stored in the blockchain address record 304. The score generation module 1116 can generate local trust scores for each of the blockchain addresses. The score generation module 1116 can also update the local trust scores over time, such as when additional data is acquired. A blockchain address record 304 can include the most recently calculated local trust score, as well as historically calculated local trust scores. In some implementations, the trust module 300 can leverage the change in local trust score (and historical score) to provide a real-time alerting system, such that a party can be notified if the trust score of an address drops (e.g., as in the case of an organization receiving fraudulent funds through an address they control). The trust module 300 may provide an API that can hook into their service that can freeze the transaction and alert the relevant people at that organization (e.g., by phone, email, etc.).

The score generation module 1116 may be configured to provide the local trust score in a variety of formats. In some implementations, the local trust score may be an integer value with a minimum and maximum value. For example, the local trust score may range from 1-7, where a trust score of '1' indicates that the blockchain address is likely fraudulent. In this example, a trust score of '7' may indicate that the blockchain address is not likely fraudulent (i.e., very trustworthy). In some implementations, the local trust score may be a decimal value. For example, the local trust score may be a decimal value that indicates a likelihood of fraud (e.g., a percentage value from 0-100%). In some implementations, a local trust score may range from a maximum negative value to a maximum positive value (e.g., −1.00 to 1.00), where a larger negative value indicates that the address is more likely fraudulent. In this example, a larger positive value may indicate that the address is more likely trustworthy. The customer may select the trust score format they prefer.

In some implementations, the blockchain address record 304 can store request data 1128 for each trust request. The request data 1128 may include any data associated with a received trust request and/or the provided trust response. The request data 1128 may be stored in the associated blockchain address record 304. In some implementations, a blockchain address record may store request data 1128 each time a trust request is made for the blockchain address. In these implementations, the request data 1128 may indicate a number of times a trust request was made for the blockchain address. The request data 1128 may also indicate the blockchain address that made the trust request, the consensus trust score that was reported to the requestor, and the time of the request. Accordingly, the request data 1128 may show trends over time regarding the parties that are requesting trust scores for a blockchain address. In some implementations, the scoring features for a blockchain address may include scoring features that are based on the request data 1128. One example scoring feature may be a total number of times a trust request was made for the blockchain address. Another example scoring feature may be a number of different blockchain addresses that made trust requests for the blockchain address. Other example features may include the frequency at which trust requests were made for the blockchain address (e.g., a number of requests over a time period).

Although the trust module 300 may calculate a single local trust score for each of the blockchain addresses, regardless of whether the blockchain address is a sender or receiver, in some implementations, the trust module 300 may calculate a receiver trust score and a sender trust score for each address. In one example, a blockchain address which regularly falls prey to scams can have the sender trust score set as less trustworthy than a blockchain address which does not often fall prey to scams. In another example, a blockchain address which regularly falls prey to phishing scams may not have a modified receiver trust score when there is no indication of nefarious activity associated with receiving funds at the blockchain address.

Modules and data stores included in the trust network 100 represent features that may be included in the trust network 100 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provide communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the trust network 100 may include one or more computing devices (e.g., node computing/server devices) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the trust network 100 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices may reside within a single machine at a single geographic location in some examples. In other examples, the one or more computing devices may reside within multiple machines at a single geographic location. In still other examples, the one or more computing devices of the trust network 100 may be distributed across a number of geographic locations.

What is claimed is:

1. A method comprising:
   acquiring, at a node server, blockchain data for a blockchain address on a blockchain network, wherein the blockchain data includes a plurality of transactions for the blockchain address;
   generating, at the node server, a local node trust score for the blockchain address based on the blockchain data for the blockchain address, wherein the local node trust score indicates a likelihood that the blockchain address is involved in fraudulent activity;
   receiving, from a plurality of remote servers, a plurality of additional local trust scores for the blockchain address;
   determining, at the node server, a consensus trust score based on the local node trust score and the plurality of additional local trust scores, wherein the consensus trust score indicates a consensus value for the local node trust score among the node server and the plurality of remote servers;
   updating, by the node server, a consensus trust score ledger with the consensus trust score, the consensus trust score ledger being distributed across the node server and at least a subset of the plurality of remote servers;
   receiving, at the node server, a trust request for the blockchain address from a requesting device; and
   sending, from the node server, the consensus trust score for the specified blockchain address to the requesting device.

2. The method of claim 1, further comprising:
   generating, at the node server, a trust score list including a frequency distribution that includes the local node trust score and the plurality of additional local trust scores;
   identifying, at the node server, outlier trust scores included in the trust score list;
   removing, at the node server, the identified outlier trust scores; and
   determining, at the node server, the consensus trust score based on the trust scores included in the trust score list after removing the identified outlier trust scores.

3. The method of claim 1, further comprising:
   generating, at the node server, a trust score list including a frequency distribution that includes the local node trust score and the plurality of additional local trust scores; and
   determining, at the node server, the consensus trust score based on a weighted average of the local node trust score and the plurality of additional local trust scores in the trust score list.

4. The method of claim 1, further comprising:
   generating, at the node server, a trust score list including a frequency distribution that includes the local node trust score and the plurality of additional local trust scores;
   determining, at the node server, whether the trust score list includes greater than a threshold number of trust scores; and
   determining, at the node server, the consensus trust score based on the trust scores included in the trust score list when the trust score list includes greater than the threshold number of trust scores.

5. The method of claim 1, further comprising:
   generating, at the node server, a trust score list including a frequency distribution that includes the local node trust score and the plurality of additional local trust scores;
   identifying, at the node server, outlier trust scores included in the trust score list;
   requesting, from the plurality of remote servers, new local trust scores in response to identifying the outlier trust scores;

receiving, at the node server, the new local trust scores; and determining, at the node server, the consensus trust score based on the new local trust scores.

6. The method of claim 1, further comprising:

determining, at the node server, a local candidate consensus trust score based on the local node trust score and the plurality of additional local trust scores; and determining, at the node server, the consensus trust score based on the candidate consensus trust score.

7. The method of claim 6, further comprising:

receiving, from the plurality of remote servers, a plurality of additional candidate consensus trust scores for the blockchain address; and determining, at the node server, the consensus trust score based on the local candidate consensus trust score and the plurality of additional candidate consensus trust scores.

8. The method of claim 1, further comprising receiving, at the node server, a reward payment based on calculation of at least one of the local node trust score and the consensus trust score.

9. The method of claim 1, further comprising receiving, at the node server, a reward payment based on an amount of communication between the node server and the plurality of remote servers.

10. The method of claim 1, further comprising:

determining, at the node server, that the consensus trust score indicates that the blockchain address is likely involved in fraudulent activity; and sending a fraud alert to a fraud alert requesting device in response to determining that the consensus trust score indicates that the blockchain address is likely involved in fraudulent activity.

11. The method of claim 1, further comprising:

acquiring, at the node server, new blockchain data for the blockchain address;

generating, at the node server, a new local node trust score for the blockchain address based on the new blockchain data; and determining, at the node server, a new consensus trust score based on the new local node trust score.

12. The method of claim 1, further comprising:

receiving, from the plurality of remote servers, a plurality of new additional local trust scores for the blockchain address; and determining, at the node server, a consensus trust score based on the local node trust score and the plurality of new additional local trust scores.

13. A system comprising:

one or more memory components configured to store blockchain data for a blockchain address on a blockchain network, wherein the blockchain data includes a plurality of transactions for the blockchain address; and one or more processing units configured to execute computer-readable instructions that cause the one or more processing units to:

generate a local node trust score for the blockchain address based on the blockchain data for the blockchain address, wherein the local node trust score indicates a likelihood that the blockchain address is involved in fraudulent activity;

receive, from a plurality of remote servers, a plurality of additional local trust scores for the blockchain address;

determine a consensus trust score based on the local node trust score and the plurality of additional local trust scores, wherein the consensus trust score indicates a consensus value for the local node trust score among the plurality of remote servers;

update a consensus trust score ledger with the consensus trust score, the consensus trust score ledger being distributed across the node server and at least a subset of the plurality of remote servers;

receive a trust request for the blockchain address from a requesting device;

send the consensus trust score for the specified blockchain address to the requesting device.

14. The system of claim 13, wherein the one or more processing units are configured to:

generate a trust score list including a frequency distribution that includes the local node trust score and the plurality of additional local trust scores;

identify outlier trust scores included in the trust score list;

remove the identified outlier trust scores; and determine the consensus trust score based on the trust scores included in the trust score list after removing the identified outlier trust scores.

15. The system of claim 13, wherein the one or more processing units are configured to:

generate a trust score list including a frequency distribution that includes the local node trust score and the plurality of additional local trust scores; and determine the consensus trust score based on a weighted average of the local node trust score and the plurality of additional local trust scores in the trust score list.

16. The system of claim 13, wherein the one or more processing units are configured to:

generate a trust score list including a frequency distribution that includes the local node trust score and the plurality of additional local trust scores;

determine whether the trust score list includes greater than a threshold number of trust scores; and determine the consensus trust score based on the trust scores included in the trust score list when the trust score list includes greater than the threshold number of trust scores.

17. The system of claim 13, wherein the one or more processing units are configured to:

generate a trust score list including a frequency distribution that includes the local node trust score and the plurality of additional local trust scores;

identify outlier trust scores included in the trust score list;

request, from the plurality of remote servers, new local trust scores in response to identifying the outlier trust scores;

receive the new local trust scores; and determine the consensus trust score based on the new local trust scores.

18. The system of claim 13, wherein the one or more processing units are configured to:

determine a local candidate consensus trust score based on the local node trust score and the plurality of additional local trust scores; and determine the consensus trust score based on the candidate consensus trust score.

19. The system of claim 18, wherein the one or more processing units are configured to:

receive, from the plurality of remote servers, a plurality of additional candidate consensus trust scores for the blockchain address; and determine the consensus trust score based on the local candidate consensus trust score and the plurality of additional candidate consensus trust scores.

20. The system of claim 13, wherein the one or more processing units are configured to receive a reward payment based on calculation of at least one of the local node trust score and the consensus trust score.

21. The system of claim 13, wherein the one or more processing units are configured to receive a reward payment based on an amount of communication with the plurality of remote servers.

22. The system of claim 13, wherein the one or more processing units are configured to:
- determine that the consensus trust score indicates that the blockchain address is likely involved in fraudulent activity; and
- send a fraud alert to a fraud alert requesting device in response to determining that the consensus trust score indicates that the blockchain address is likely involved in fraudulent activity.

23. The system of claim 13, wherein the one or more processing units are configured to:
- acquire new blockchain data for the blockchain address;
- generate a new local node trust score for the blockchain address based on the new blockchain data; and
- determine a new consensus trust score based on the new local node trust score.

24. The system of claim 13, wherein the one or more processing units are configured to:
- receive, from the plurality of remote servers, a plurality of new additional local trust scores for the blockchain address; and
- determine a consensus trust score based on the local node trust score and the plurality of new additional local trust scores.

\* \* \* \* \*